(12) United States Patent
Caron et al.

(10) Patent No.: US 7,008,690 B2
(45) Date of Patent: Mar. 7, 2006

(54) OPTICAL ARTICLE COMPRISING A QUARTER-WAVE PLATE AND METHOD FOR MAKING SAME

(75) Inventors: Pierre Caron, Paris (FR); Jean-Paul Cano, Chennevieres sur Marne (FR); Annette Cretier, Ivry sur Seine (FR)

(73) Assignee: Essilor International Compagnie Generale d'Optique, Charenton Cedex (FR)

( * ) Notice: Subject to any disclaimer, the term of this patent is extended or adjusted under 35 U.S.C. 154(b) by 8 days.

(21) Appl. No.: 10/466,160

(22) PCT Filed: Dec. 26, 2002

(86) PCT No.: PCT/FR02/04567

§ 371 (c)(1),
(2), (4) Date: Nov. 13, 2003

(87) PCT Pub. No.: WO03/056366

PCT Pub. Date: Jul. 10, 2003

(65) Prior Publication Data
US 2004/0074261 A1    Apr. 22, 2004

(30) Foreign Application Priority Data
Dec. 27, 2001 (FR) .................................. 01 16952

(51) Int. Cl.
*B32B 3/00*    (2006.01)

(52) U.S. Cl. .............. 428/306.6; 428/313.5; 428/313.7; 428/313.9; 428/316.6; 428/317.1; 428/318.4; 428/701; 428/702; 428/697; 428/423.1; 428/424.2; 428/425.5; 428/425.9; 428/446; 428/913; 351/159; 351/166; 359/580; 359/582; 359/620; 359/627

(58) Field of Classification Search ............. 428/306.6, 428/313.5, 313.7, 313.9, 316.6, 317.1, 318.4, 428/701–702, 697, 423.1, 424.2, 425.5, 425.9, 428/446, 913; 359/580, 582, 620, 627; 351/159, 351/166
See application file for complete search history.

(56) References Cited

U.S. PATENT DOCUMENTS

| 4,211,823 A | | 7/1980 | Suzuki et al. ..................... 83/4 |
| 4,759,611 A | * | 7/1988 | Downey, Jr. .................. 349/97 |
| 5,015,523 A | | 5/1991 | Kawashima et al. ........ 428/336 |
| 5,316,791 A | | 5/1994 | Farber et al. ................ 427/464 |
| 5,476,717 A | | 12/1995 | Floch .......................... 428/421 |

(Continued)

FOREIGN PATENT DOCUMENTS

EP    040411    5/1981

(Continued)

*Primary Examiner*—Ling Xu
(74) *Attorney, Agent, or Firm*—Fulbright & Jaworski, L.L.P.

(57) ABSTRACT

An optical item comprising an organic or mineral glass substrate (1) and a transparent polymeric material layer (3), characterized in that it comprises at least one intermediate layer (2) in direct contact with one main side of the substrate and the polymeric material layer, the intermediate layer(s) being made of particles of at least one colloidal mineral oxide and optionally of a binder, such (an) intermediate layer(s) having an initial porosity, and the initial porosity of the intermediate layer(s) being filled either by material from the polymeric material layer or by the substrate material if the latter is made in an organic glass and, optionally partly by the binder when present, so that the intermediate layer(s), after initial porosity filling, each represent a quarter waveplate with a wavelength in the range from 400 to 700 nm, preferably from 450 to 650 nm.

64 Claims, 13 Drawing Sheets

U.S. PATENT DOCUMENTS 5,619,288 A    4/1997    White et al. ................ 351/159

FOREIGN PATENT DOCUMENTS

| | | |
|---|---|---|
| EP | 0445686 | 3/1991 |
| EP | 614957 | 3/1994 |
| EP | 0962789 | 6/1999 |
| EP | 1089093 | 9/2000 |
| FR | 2790317 | 2/1999 |
| JP | 63-87223 | 9/1986 |
| JP | 63-141001 | 12/1986 |
| WO | WO 94/10230 | 11/1993 |

* cited by examiner

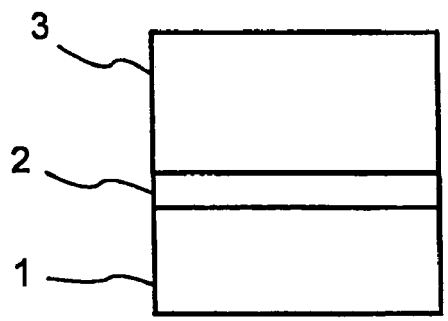
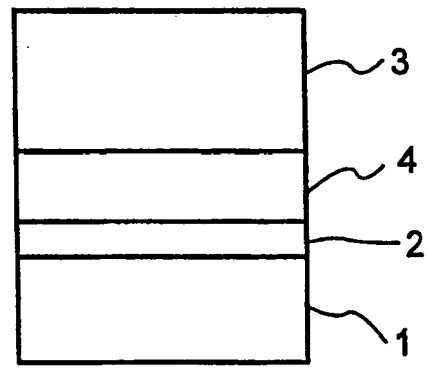
FIGURE 1      FIGURE 2
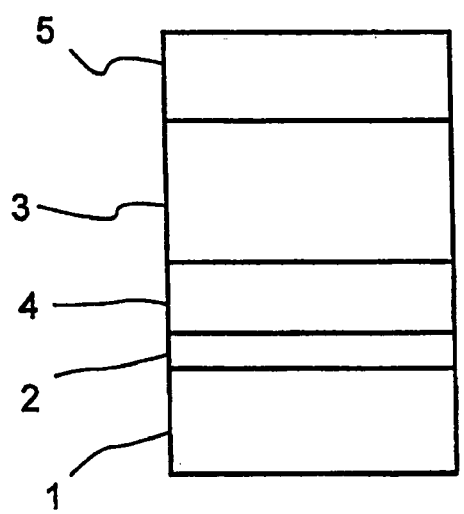
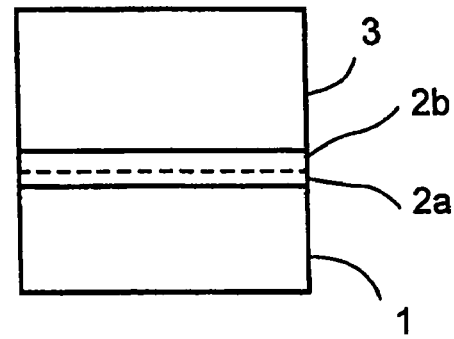
FIGURE 3      FIGURE 4

ОПТICAL ARTICLE COMPRISING A QUARTER-WAVE PLATE AND METHOD FOR MAKING SAME

CROSS-REFERENCE TO RELATED APPLICATIONS

This application is a national phase application under 35 U.S.C. 0 371 of PCT Application No. PCT/FR02/04567 filed 26 Dec. 2002, which claims priority to French Application No. 01/16952 filed 27 Dec. 2001, the contents of which are incorporated herein by reference in their entirety.

BACKGROUND OF THE INVENTION (1) Field of the Invention

The present invention relates to an optical item, for example an ophthalmic lens, comprising a transparent substrate made from a synthetic resin or mineral glass, particularly with a high refractive index ($n_D^{25}$=1.5 or higher, preferably 1.55 or higher), at least one transparent coating such as an anti-abrasion coating or a primer layer and an anti-abrasion coating and a quarter waveplate layer interposed between the substrate and the transparent coating.

Conventionally, one or more coatings are formed on the main sides of a transparent substrate made of synthetic resin or mineral glass, such as an opthalmic lens, in order to impart to the item several advantageous properties such as shock resistance, abrasion resistance, reflection removal, etc.

Thus, generally, at least one side of the substrate is coated either directly with an abrasion resistant layer, or with a primer layer, generally a layer for improving the shock resistance of the lens, on which an abrasion resistant layer may be applied, the primer layer improving the anchoring of such an abrasion resistant layer on the substrate side. Finally, an anti-reflection coating may be applied to the abrasion resistant layer.

Generally, the substrate and the abrasion resistant layer or the primer layer have different refractive indices and consequently interference fringes occur because of such an index difference at the interface between the substrate and the abrasion resistant layer or the primer layer.

(2) Description of Related Art

U.S. Pat. No. 4,609,267 discloses a lens comprising a substrate made of a synthetic resin with a high refractive index ($\geq$1.55), one face of which is coated with an abrasion resistant layer of a dielectric substance with a refractive index different from that of the substrate and which, in order to reduce the reflection at the interface between the substrate and the abrasion resistant layer, comprises at least one anti-reflective layer of a dielectric or metallic substance applied between the substrate and the abrasion resistant layer.

The abrasion resistant layer is a layer of $SiO_2$.

The interposed anti-reflective layer is a quarter waveplate and consists either in a single layer of a blend of $SiO_2$ and aluminum oxide or two layers, one layer of $SiO_2$ and a second one made of a material selected amongst $ZrO_2$, $HfO_2$, $Ti_2O_3$, $TiO_2$, $Ta_2O_5$, $Si_3N_4$, $Yb_2O_3$, $Y_2O_3$ or $Al_2O_3$.

Such anti-reflective and abrasion resistant layers are made through vacuum evaporation.

Nowadays, in order to form the abrasion resistant primer and coating layers, varnishes are used, i.e., compositions leading to a largely organic material as opposed to layers with an essentially mineral nature such as metal oxide and/or silicon oxide layers.

Moreover, in the industrial ophthalmic lens manufacturing processes, applying such varnish layers occurs by dipping in a varnish solution or dispersion bath or through centrifuging a solution or a dispersion on one side of the substrate.

If the refractive index of the varnish and that of the organic glass substrate do not match, i.e. if such refractive indices are significantly different, an interference fringe phenomenon also appears at the interface between the substrate and the varnish.

BRIEF SUMMARY OF THE INVENTION

An object of the present invention is therefore to provide an optical item, such as an ophthalmic lens, comprising an organic or mineral glass substrate and at least one transparent polymeric material layer, such as, for example, a primer layer or an anti-abrasion coating layer wherein the interference fringe phenomenon linked to the refractive index difference of the substrate and the polymer material layer occurring at the interface between the substrate and the polymeric material layer is significantly mitigated. Another object of the invention is to provide an optical item that is stable in time and more particularly, photodegradation resistant.

Another further object of the invention is to provide a method for manufacturing an optical item such as defined hereunder, being easily integrated into the conventional manufacturing method and which, more particularly, prevents as much as possible implementing vacuum coating or any other processing step being a break in optical item manufacturing method.

DETAILED DESCRIPTION OF THE INVENTION

The above-mentioned aims are reached according to the invention with an optical item, for example, an ophthalmic lens and more particularly a spectacle lens, comprising an organic or mineral glass substrate and an optically transparent polymeric material layer characterized in that it comprises at least one intermediate layer in direct contact with one main side of the substrate and the polymeric material layer, the intermediate layer(s) being made of particles of at least one colloidal mineral oxide and optionally of a binder, such (an) intermediate layer(s) having an initial porosity, and the initial porosity of the intermediate layer(s) being filled either by material from the polymeric material layer or by the substrate material if the latter is made in an organic glass and, optionally partly by the binder when present, so that the intermediate layer(s), after initial porosity filling, each represent a quarter waveplate with a wavelength in the range from 400 to 700 nm, preferably from 450 to 650 nm.

The invention also relates to a method for manufacturing an optical item such as previously defined comprising the steps of:

a) forming on at least one main surface of a transparent support, through dip coating or centrifugation in or of a sol of at least one colloidal mineral oxide optionally containing a binder and sol drying, of at least one intermediate layer with an initial porosity; and b) forming on such an intermediate layer either an optically transparent polymeric material layer or an organic glass substrate;

the initial porosity of the intermediate layer(s) being filled either by polymeric material of the layer or by substrate material formed at step b) and optionally, partly, by the binder of the intermediate layer(s) so that the intermediate layer(s), after initial porosity filling, each represent a quarter waveplate with a wavelength in the range from 400 to 700 nm, preferably from 450 to 650 nm.

Generally, the initial porosity of the intermediate layer(s), in the absence of a binder, accounts for at least 40% in volume, based on the total volume of the intermediate layer(s).

Preferably, the porosity in the absence of a binder in the intermediate layer(s) accounts for at least 50% by volume.

When the intermediate layer(s) comprise(s) a binder, the actual porosity of such (a) layer(s), i.e. the porosity remaining taking into account the volume occupied by the binder, but before filling by the polymeric material from the previous layer accounts for, preferably, 25%, more preferably 30% in volume based on the total volume of the intermediate layer.

The support on which the intermediate layer is formed may be an organic or mineral substrate, preferably an organic glass, such as a preformed ophthalmic lens, or may be a main moulding surface of a mould part comprising at least one coating representing the optically transparent polymeric material layer designed to be applied or transferred onto an organic or mineral glass substrate.

In the latter case, when the substrate is made of an organic glass, it may be formed in situ upon cast transfer of a liquid polymerizable composition in the mould and polymerization and then the substrate material ensures the porosity filling in the mineral oxide intermediate layer.

The filling polymeric material layer has a surface force energy higher than or equal to 20 milliJoules/m², preferably higher than or equal to 25 milliJoules/m² and more preferably, higher than or equal to 30 milliJoules/m².

The surface force energy is calculated according to Owens-Wendt method described in the following reference: "Estimation of the surface force energy of polymers" Owens D. K., Wendt R. G. (1969), J. APPL. POLYM. SCI, 13, 1741–1747.

The composition leading to the filling polymeric material comprises essentially one (or more) non fluorinated compound(s).

Preferably, the composition leading to the filling polymeric material comprises at least 80% of non fluorinated compounds based on the total weight of the compounds forming the dry extract (1) of said composition, more preferably at least 90% by weight, most preferably at least 95% by weight and much more preferably 100% by weight.

Typically, the fluorine level (by weight) in the filling polymeric material is lower than 5% by weight, preferably lower than 1% by weight and more preferably 0% by weight.

The porosity of the quarter waveplate (after filling) is preferably lower than 5%, more preferably lower than 3% and most preferably 0%.

After filling, the filling material contacts the substrate surface (when the filling material is not that of the substrate but that of another layer such as the primer or antiabrasion layer) and makes it possible to obtain the quarter waveplate adhesion on the substrate.

It is meant under dry extract according to the present invention the weight fraction of solid matters remaining after heating at 100° C. for 15 minutes.

When the polymeric material layer ensuring the filling of the intermediate layer porosity does not constitute the substrate, such a layer is generally formed by dip coating or centrifugation, preferably by centrifugation.

BRIEF DESCRIPTION OF THE SEVERAL VIEWS OF THE DRAWINGS

The remainder of the disclosure refers to the appended figures wherein respectively:

FIG. 1 is a schematic illustration of an embodiment of an optical item comprising a quarter waveplate according to the invention;

FIG. 2 is a schematic illustration of another embodiment of an optical item comprising a quarter waveplate according to the invention;

FIG. 3 is a schematic illustration of another further embodiment of an optical item according to the invention;

FIG. 4 is a schematic illustration of an optical item comprising two quarter waveplates according to the invention;

Figure 5:
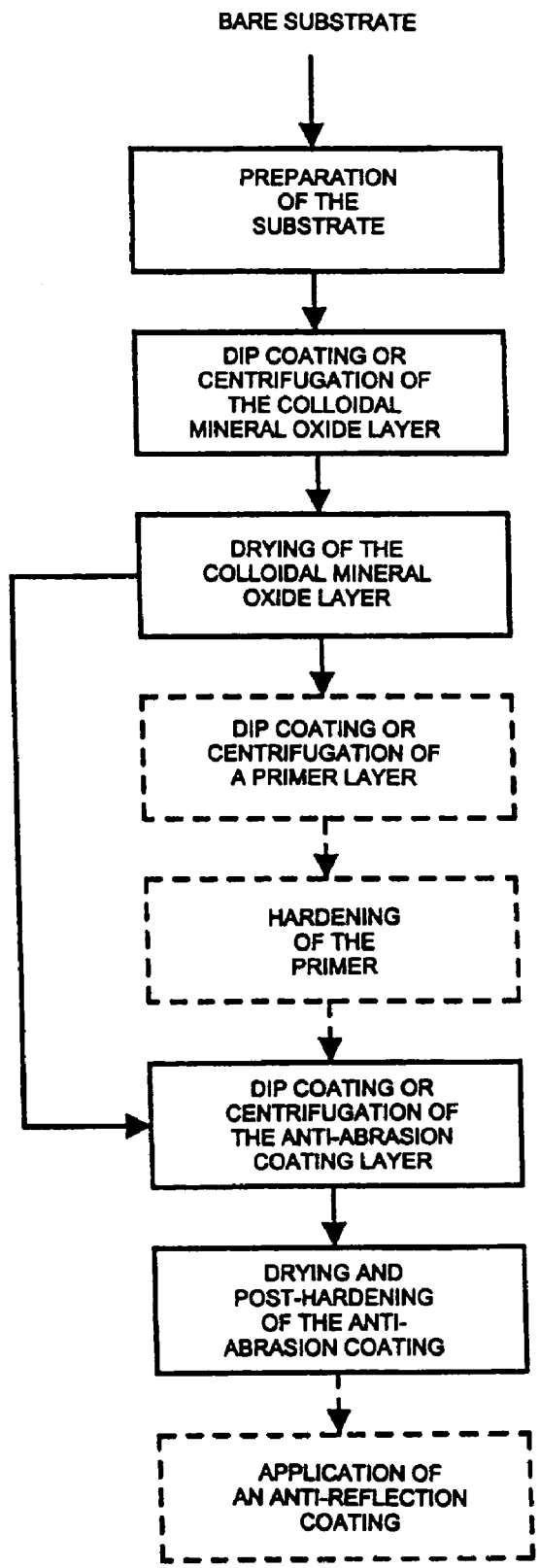
FIG. 5 is a flow chart of a method for manufacturing an optical item according to the invention.

The optical and geometrical features of a quarter waveplate are given by the following relationships:

$$n=(n_s \times n_v)^{1/2}$$

$$n.e = \lambda/4$$

wherein n is the refractive index at 25° C. for the wavelength λ=550 nm of the quarter waveplate (wavelength corresponding to the maximal sensitiveness of the eye);

$n_s$ is the refractive index at 25° C. for the wavelength λ=550 nm of the substrate, $n_v$ is the refractive index at 25° C. for the wavelength λ=550 nm of the polymeric material layer directly in contact with the quarter waveplate.

In other words, the index n of the quarter waveplate is the geometrical mean of the material indices surrounding it.

In FIG. 1, there is schematically illustrated an optical item according to the invention comprising an optically transparent substrate 1, for example, in an organic glass. One of the main sides of the substrate 1 is coated with a layer of at least one colloidal mineral oxide with an initial porosity in the absence of a binder of at least 40% by volume and with an appropriate thickness. An anti-abrasion coating layer 3 is formed on the colloidal mineral oxide layer so as to fill the initial porosity, or the actual porosity when a binder is present, of the colloidal mineral oxide layer and achieve the quarter waveplate 2.

FIG. 2 schematically illustrates an optical item differing from the optical item in FIG. 1 in that an anti-shock primer layer 4 is interposed between the colloidal mineral oxide layer and the anti-abrasion coating layer 3. In such a case, the initial or actual porosity of the oxide layer is obviously filled by the primer material for forming the quarter waveplate 2.

With the knowledge of the refractive indices of the substrate $n_s$ and the anti-abrasion or primer coating $n_v$ (for example at 25° C. and for λ=550 nm), the formulas hereunder allow to determine in principle the thickness e and the refractive index n of the quarter waveplate.

Thus, table I hereunder gives the thickness and refractive index features of the quarter waveplates for various substrate and anti-abrasion or primer coating layer combinations.

| | SUBSTRATES | | | |
|---|---|---|---|---|
| Quarter waveplate at 550 nm | Polycarbonate PC ($n_s$ = 1590) | MR6 (MITSUI) ($n_s$ = 1595) | MR7 (MITSUI) ($n_s$ = 1665) | 1.74 (MITSUI) ($n_s$ = 1.74) |
| PU latex ($n_s$ = 1500) - Plate index λ/4 | 1.544 | 1.547 | 1.580 | 1.615 |
| Plate thickness λ/4 | 89 nm | 89 nm | 87 nm | 85 nm |
| Epoxyalkoxysilane/silica ($n_v$ = 1.477) - Plate index λ/4 | 1.532 | 1.535 | 1.568 | 1.603 |
| Plate thickness λ/4 | 90 nm | 89 nm | 88 nm | 86 nm |

FIG. 3 represents an optical item according to the invention similar to that in FIG. 2, but comprising additionally an anti-reflection coating 5 formed on the anti-abrasion coating 3.

FIG. 4 represents an optical item according to the invention similar to that in FIG. 1, but comprising two quarter wave intermediate layers 2a, 2b. Most obviously, such a stack of two intermediate layers can also be made with the optical items shown in FIGS. 2 and 3.

The substrates suited for the items according to the present invention can be any optically transparent substrate made in mineral or organic glass, preferably in organic glass.

The plastic materials appropriate for such substrates include the homo- and copolymers of carbonate, (meth)acrylics, thio(meth)acrylics, diethylene glycol bisallylcarbonate such as the material CR39® marketed by PPG, urethane, thiourethane, epoxide, episulfide and the combinations thereof.

The preferred material for the substrates are polycarbonates (PC), polyurethanes (PU), polythiourethanes, (meth)acrylic and thio(meth)acrylic polymers.

Generally, the substrates have a refractive index $n_D^{25}$ ranging from 1.55 to 1.80 and preferably from 1.60 to 1.75.

The intermediate layer(s) 2 or 2a, 2b comprise at least a colloidal mineral oxide generally selected amongst $SiO_2$, $TiO_2$, $ZrO_2$, $SnO_2$, $Sb_2O_3$, $Y_2O_3$, $Ta_2O_5$ and the combinations thereof. The preferred colloidal mineral oxides are $SiO_2$, $TiO_2$, $ZrO_2$, and the mixtures of $SiO_2/TiO_2$ and $SiO_2/ZrO_2$.

The preferred colloidal silicas are those silicas prepared by the Stöber method. The Stöber method is a simple and well known method comprising a hydrolysis and condensation of the ethyl tetrasilicate (Si $(OC_2H_5)_4$ or TEOS) in ethanol catalyzed by ammonia. The method allows to obtain a silica directly in ethanol, a quasi monodispersed particle population, a controlable particle size and a particle surface ($SiO^-NH_4^+$).

In the case of a mixture of colloidal mineral oxides, preferably the mixture comprises at least one high index oxide, i.e. with a refractive index $n_D^{25} \geq 1.54$ and at least one low index oxide, i.e. with a refractive index $n_D^{25} < 1.54$. Preferably, the mineral oxide mixtures are binary mixtures, more particularly of a low index oxide and a high index oxide. Generally, the low index oxide/high index oxide weight ratio ranges from 20/80 to 80/20, preferably from 30/70 to 70/30 and more preferably from 40/60 to 60/40.

The particle size of the mineral oxide generally ranges from 10 to 80 nm, more preferably from 30 to 80 nm and most preferably from 30 to 60 nm.

Particularly, the mineral oxide may be made of a mixture of small size particles, i.e. ranging from 10 to 15 nm, and large size particles, i.e. from 30 to 80 nm.

Typically, the layer 2 or each of the intermediate layers 2a, 2b of colloidal mineral oxide has a thickness ranging from 60 to 100 nm, preferably from 70 to 90 nm, and more preferably from 80 to 90 nm, with the proviso that such a thickness should be as close as possible to the theoretical thickness of a quarter waveplate, considering the materials being used for the optical item, for an optimal result of the interference fringes being reduced.

The colloidal mineral oxide layers may optionally contain, before filling by the polymeric material layer, for example, from 1 to 30% by weight of at least one binder based on the dry weight of mineral oxide of the layer, and preferably from 10 to 25% and more preferably from 10 to 20% by weight.

The binder is generally a polymeric material which is not prejudicial to the optical properties of the final quarter waveplate and which increases the cohesion and the adhesion of the mineral oxide particles on the substrate surface.

The binders are generally materials similar to the anti-shock primer compositions being described hereunder.

The preferred binders are polyurethane latices and (meth)acrylic latices, more particularly polyurethane latices.

As previously indicated, the or each of the intermediate layers of colloidal mineral oxide have a porosity of at least 40% by volume and preferably in the order of 50% by volume based on the total volume of the layer, in the absence of a binder, and before filling by the polymeric material of the primer or anti-abrasion coating layer.

The primer layer, when present, may be any primer layer conventionally used in the optical field and more particularly in the ophthalmic field.

Typically, such primers, more particularly the anti-shock primers, are coatings based on (meth)acrylic polymers, polyurethanes, polyesters or coatings based on epoxy/(meth)acrylate copolymers as well.

The (meth)acrylic polymer based anti-shock coatings are, amongst others, disclosed in U.S. Pat. Nos. 5,015,523 and 5,619,288, whereas the thermoplastic and cross-linked polyurethane resin based coatings are disclosed, amongst others, in Japanese Patents 63-1411001 and 63-87223, European Patent EP-040,411 and U.S. Pat. No. 5,316,791.

More particularly, the shock-resistant primer coating according to the invention may be manufactured from a poly(meth)acrylic latex, including of the core-shell type such as disclosed, for example, in French Patent Application FR 2,790,317, from a polyurethane latex or a polyester latex.

Particularly preferred anti-shock primer coating compositions include the acrylic latex marketed under the trade name A-639 from Zeneca and the polyurethane latices marketed under the trade names W-240 and W-234 from Baxenden Corporation.

Latices will be preferably selected with a particle size $\leq 50$ nm and more preferably $\leq 20$ nm.

Generally, after hardening, the shock-resistant primer layer has a thickness from 0.05 to 20 µm, preferably from 0.5 to 10 µm and more preferably from 0.6 to 6 µm. The optimal thickness generally ranges from 0.5 to 2 µm.

The anti-abrasion coating may be any anti-abrasion coating conventionally used in the optical field and, more particularly, in ophthalmic optics.

By definition, an anti-abrasion coating is a coating improving the abrasion resistance of the finished optical item as compared with a similar item which does not comprise the anti-abrasion coating.

The preferred anti-abrasion coatings are those obtained through hardening of a composition containing one or more alkoxysilane(s) (preferably one or more epoxyalkoxysilane(s)) or a hydrolyzate thereof and preferably a mineral colloidal filler, such as a colloidal oxide filler.

According to a particular aspect, the preferred anti-abrasion coatings are those obtained through hardening of a composition comprising one or more epoxyalkoxysilanes or a hydrolyzate thereof, silica and a hardening catalyst. Examples of such compositions are disclosed in the International Application WO 94/10230 and U.S. Pat. Nos. 4,211,823, 5,015,523 as well as the European Patent 614, 957.

The particularly preferred anti-abrasion coating compositions are those comprising as main constituents an epoxyalkoxysilane such as, for example, the γ-glycidoxypropyltrimethoxysilane (GLYMO), a dialkyl-dialkoxysilane, such as, for example, the dimethyldiethoxysilane (DMDES), a colloidal silica and a catalytic amount of a hardening catalyst such as aluminum acetylacetonate or a hydrolyzate of such constituents, the balance of the composition essentially consisting in solvents conventionally used for formulating such compositions and optionally one or more surfactants.

In order to improve the anti-abrasion coating adhesion, the anti-abrasion coating composition may optionally comprise an effective amount of a coupling agent, more particularly, when the coated substrate is made using the in-mould casting technique or IMC.

Such a coupling agent is typically a pre-condensed solution of an epoxyalkoxysilane and an unsaturated alkoxysilane, preferably comprising a terminal double ethylene bonding.

Examples of epoxyalkoxysilanes are:
γ-glycidoxypropyltrimethoxysilane,
γ-glycidoxypropylpentamethyldisiloxane,
γ-glycidoxypropylmethyldiisopropenoxysilane,
(γ-glycidoxypropyl)methyldiethoxysilane,
γ-glycidoxypropyldimethoxyethoxysilane,
γ-glycidoxypropyldiisopropylethoxysilane, and
(γ-glycidoxypropyl)bis(trimethylsiloxy)methylsilane.

The preferred epoxyalkoxysilane is the (γ-glycidoxypropyl)-trimethoxysilane.

The unsaturated alkoxysilane may be a vinylsilane, an allylsilane, an acrylic or methacrylic silane.

Examples of vinylsilanes are:
vinyltris(2-methoxyethoxy)silane,
vinyltris-isobutoxysilane,
vinyltri-t-butoxysilane,
vinyltriphenoxysilane,
vinyltrimethoxysilane,
vinyltriisopropoxysilane,
vinyltriethoxysilane,
vinyltriacetoxysilane,
vinylmethyldiethoxysilane,
vinylmethyldiacetoxysilane,
vinyl-bis(trimethylsiloxy)silane and vinyldimethoxysilane.

Examples of allylsilanes include allyltrimethoxysilane, allyltriethoxysilane and allyltris(trimethylsiloxy)silane.

Examples of acrylic silanes are:
3-acryloxypropyltris(trimethylsiloxy)silane,
3-acryloxypropyltrimethoxysilane,
acryloxypropylmethyldimethoxysilane,
3-acryloxypropylmethylbis(trimethylsiloxy)silane,
3-acryloxypropyldimethylmethoxysilane, and
n-(3-acryloxy-2-hydroxypropyl)-3-aminopropyltriethoxysilane.

Examples of methacrylic silanes are:
3-methacryloxypropyltris(vinyldimethoxylsiloxy)silane,
3-methacryloxypropyltris(trimethylsiloxy)silane,
3-methacryloxypropyltris(methoxyethoxy)silane,
3-methacryloxypropyltrimethoxylsilane,
3-methacryloxypropylpentamethyldisiloxane,
3-methacryloxypropylmethyldimethoxysilane,
3-methacryloxypropylmethyldiethoxysilane,
3-methacryloxypropyldimethylmethoxysilane,
3-methacryloxypropyldimethylethoxysilane,
3-methacryloxypropenyltrimethoxysilane, and
3-methacryloxypropylbis(trimethylsiloxy)methylsilane.

The preferred silane is the acryloxypropyltrimethoxysilane.

Typically, the amount of coupling agent introduced into the anti-abrasion coating composition accounts for 0.1 to 15% by weight of the total weight of the composition, preferably from 1 to 10% by weight.

The anti-abrasion coating thickness, after hardening, usually ranges from 1 to 15 µm, preferably from 2 to 6 µm.

The anti-shock primer and anti-abrasion coating compositions may be hardened thermally and/or through radiation, preferably thermally.

Most obviously, as previously indicated, the material of the primer layer or of the anti-abrasion coating layer should penetrate into and fill the porosity of the colloidal mineral oxide intermediate layer.

As will be seen hereunder, the anti-shock primer and anti-abrasion coating layers are preferably formed through dip coating or centrifugation. Therefore, the compositions for forming such layers are preferably sol-gel compositions.

The optical item according to the invention may optionally comprise an anti-reflection coating formed on the anti-abrasion coating layer.

The anti-reflection coating may be any anti-reflection coating conventionally used in the optical field, more particularly, in the ophthalmic optic field.

By way of an example, the anti-reflection coating may consist in a mono- or multilayer film, dielectric materials such as $SiO$, $SiO_2$, $Si_3N_4$, $TiO_2$, $ZrO_2$, $Al_2O_3$, $MgF_2$ or $Ta_2O_5$ or the mixtures thereof.

It is thereby possible to prevent a reflection from occurring at the lens-air interface.

Such an anti-reflection coating is generally applied through vacuum coating according to one of the following techniques:
  through evaporation, optionally ionic beam assisted,
  through vaporisation by ion beam,
  through sputtering,
  through chemical plasma-aided coating in vapour phase.

Besides to the vacuum coating, it can also be contemplated to apply a mineral layer through a sol-gel route (for example from a tetraethoxy-silane hydrolyzate).

In the case where the film comprises one single layer, the optical thickness thereof should be equal to $\lambda/4$ ($\lambda$ is a wavelength ranging from 450 to 650 nm).

In the case of a multi-layer film comprising three layers, a combination may be used, corresponding to respective optical thicknesses of either $\lambda/4, \lambda/2, \lambda/4$ or $\lambda/4, \lambda/4, \lambda/4$.

An equivalent film can moreover be used, formed by more layers, instead of any number of the layers being part of the three above-mentioned layers.

FIG. 5 is a block diagram of the main steps of an optical item manufacturing process according to the present invention.

The surface of the bare substrate made of an organic or mineral glass, for example, an opthalmic lens, is first treated through dipping into a 5% soda solution under heat, for example at 50° C. (3 minutes), followed by water and alcohol rinsing.

This is then followed by dipping in a colloidal mineral oxide sol or sol centrifugation, preferably through dip coating, to coat the substrate treated surface with a colloidal mineral oxide layer.

In the case of a dip coating, the applied thickness depends on the sol dry matter content, on the particle size and on the unwitting rate (Landau-Levich law). Therefore, knowing the sol composition, the particle size, the refractive indices of the substrate and of the primer or anti-abrasion coating, one can determine the desired thickness for the colloidal mineral oxide layer and the unwetting rate appropriate for obtaining the desired thickness.

After the applied layer has been dried, a porous colloidal mineral oxide layer is obtained having the desired thickness. The layer porosity is an essential factor and should be at least 40% by volume, preferably at least 50% by volume in the absence of a binder and at least 25%, preferably at least 30% by volume, in the presence of a binder. The porosity of the layers can be calculated from the refractive indices of the ellipsometry measured layers.

Drying the layer after application may occur at a temperature ranging from 20 to 130° C., preferably from 20° C. to 120° C.

Preferably, drying occurs at room temperature (20–25° C.).

In the Case of a Layer which does not Comprise a Binder

The porosity of the porous colloidal mineral oxide layer is as follows:

$$p = \frac{Vp}{Vc + Vp}$$

wherein Vp is the volume of the pores contained in the layer and Vc is the volume occupied by the mineral oxide in the layer.

The porosity p of the layer is here equal to the porosity in the absence of a binder.

The value of porosity p is obtained from the refractive indices n (measured by ellipsometry) which is the refractive index of the porous mineral layer, $n_c$ which is the mean refractive index of the mineral oxide particles (optionally mixed if various oxides are used), and from the relationship:

$$n^2 = p + n_c^2(1-p)$$

wherein p is the pore volume fraction, assuming that the pores are filled with air and 1−p is the mineral oxide volume fraction.

The refractive indices are determined at 25° C. at a 632 nm wavelength.

In the Case of a Layer Containing a Binder

The porosity p of the layer is calculated from the following relationships:

$$n^2 = p + x_c n_c^2 + x_l n_l^2 \qquad (1)$$

wherein:

n is the refractive index of the porous mineral oxide layer,
p is the porosity of the $$\text{layer} = \frac{Vp}{Vtotal},$$

$x_c$ represents the mineral oxide volume fraction in the layer $$x_c = \frac{Vc}{Vtotal},$$

$x_l$ represents the binder volume fraction in the layer $$x_l = \frac{Vl}{Vtotal},$$

Vp, Vc, Vl, Vtotal respectively represent the volume occupied by the pores (air), the mineral oxide, the binder and the entire layer, $n_c$ is the mean refractive index of the mineral oxide particles, nl is the refractive index of the binder:

$$p + x_l + x_c = 1 \qquad (2)$$

$$\frac{x_l}{x_c} = \frac{m_l}{m_c} \times \left(\frac{dc}{dl}\right) \qquad (3)$$

dc is the density of the mineral oxide,
dl is the density of the binder,
$m_l$ is the binder dry mass in the layer, and
$m_c$ is the mineral oxide dry mass in the layer.

The porosity in the absence of a binder is by definition $p' = p + x_l$, i.e. the porosity that the layer would have if the binder volume were occupied by air.

The values of p and p' are obtained by measuring n ellipsometrically, the indices $n_c$ and $n_l$ being additionally known and the The various refractive indices are determined at 25° C. at the 632 nm wavelength.

In a first embodiment of the method, the anti-abrasion coating material is then dip coated (or coated through centrifugation), then dried, $m_\lambda/m_c$ ratio being experimentally determined.

for example in an oven at 75° C., for about 210 seconds and finally, post-hardened at 100° C. for 3 hours, so as to obtain the item according to the invention.

Alternatively, after the porous mineral oxide layer has been formed, an anti-shock primer composition layer is dip coated (or coated through centrifugation), followed by drying, for example in an oven at 85° C., then the anti-abrasion coating occurs as hereinabove.

Finally, optionally, an anti-reflection coating can be conventionally applied on the anti-abrasion coating.

Figure 6:
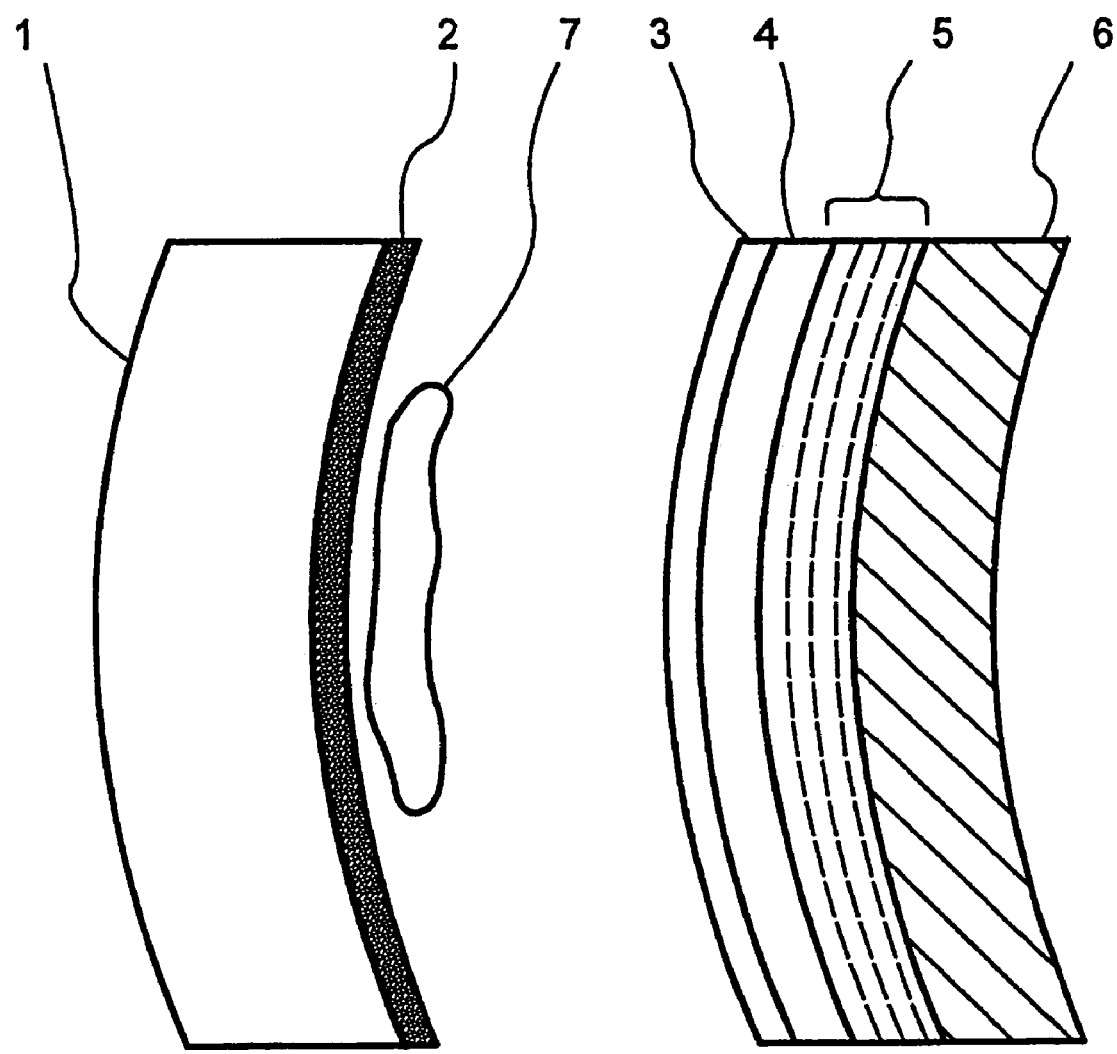
FIG. 6 is a schematic illustration of a first implementation of the method for manufacturing an optical item according to the invention.

FIG. 6 is a schematic illustration of the quarter waveplate manufacture according to the invention by transfer onto a preform.

As shown in FIG. 6, an intermediate layer 2 of colloidal mineral oxide optionally containing a binder is formed, preferably through centrifugation or dip coating on one side of a preform 1, preferably made in an organic glass.

On a mould surface 6, preferably a flexible mould, are formed, in the following order, a conventional anti-reflection coating layer 5, an anti-abrasion coating layer 4 and a primer layer 3. Preferably, the anti-reflection coating layer 5, the anti-abrasion coating layer 4 and the primer coating layer 3 are dried and/or hardened, at least partially.

Then, an adequate amount of an adhesive material is coated either on the intermediate layer 2 or on the surface of the primer layer 3, preferably, the intermediate layer 2, then the preform 1 carrying the intermediate layer 2 is pressed against all the layers 3, 4 and 5, carried by the mould 6.

After the adhesive has been hardened, the mould 6 is removed so as to obtain a lens according to the invention.

The porosity of the intermediate layer 2 is then filled with the adhesive 7 forming the polymeric material layer in direct contact with the intermediate layer 2.

In such case, the adhesive layer 7 ensures the adhesion of the stack 3, 4, 5 with the intermediate layer 2, being itself bonded with the substrate 1.

Such an adhesive 7 may be applied on the intermediate layer 2 carried by the preform 1 through centrifugation or dip coating type or on the last layer of the stack or also injected between the preform 1 carrying the intermediate layer 2 and the stack carried by the flexible mould 6.

The coating of the adhesive on the intermediate layer 2 carried by the preform 1 is the preferred embodiment.

Preferably, the adhesive 7 is a radiation hardenable organic material, for example, through UV radiation.

If the viscosity of the adhesive 7 is high, it is possible to heat the latter so as to reduce the viscosity and allow for a penetration and, therefore an optimum filling of the intermediate layer 2. The heating temperature should not be too high in order to avoid a thermal damage of the anti-reflection stack 5.

The quarter waveplate 2 formed prevents the interference fringes, more particularly when the refractive index difference between the substrate 1 and the material constituting the adhesive 7 is high. (In the most frequent case, it is the substrate 1 which has a high refractive index and the adhesive 7 which has a low refractive index).

The adjacent layer 4 higher than the adhesive layer 7 formed is generally an anti-shock primer layer.

The case can however be contemplated where the composition of the material constituting the adhesive 7 is itself formulated so as to have anti-shock properties.

In such a case, the adhesive layer 7 also plays the part of an anti-shock primer and is then directly adjacent to the anti-abrasion coating layer 4.

Such an adhesive 7 can be made of the material disclosed in U.S. Pat. No. 5,619,288 (UV hardenable acrylates).

In FIG. 6, the quarter waveplate 2 is shown from the rear of the preform. It might as well be made similarly from the front side.

However, for the front side, the quarter waveplate 2 is preferably made according to the method described in relation with FIG. 5.

The mould 6 may be stiff or flexible, but is preferably flexible.

Using a stiff mould is not recommended as it requires a large number of moulds each having a geometry surface defined so as to match with that of the preform.

On the contrary, when a flexible mould is used, having a single mould is satisfactory, with a surface the geometry of which generally matches that of the surface of the preform, i.e. a convex or a concave shape, on which the transfer is performed.

The mould may be in any appropriate material, in particular, a plastic material, for example, polycarbonate.

The flexible mould typically has a thickness ranging from 0.3 to 5 mm. Preferably, it is made in polycarbonate and has a thickness ranging from 0.5 to 1 mm.

Figure 7:
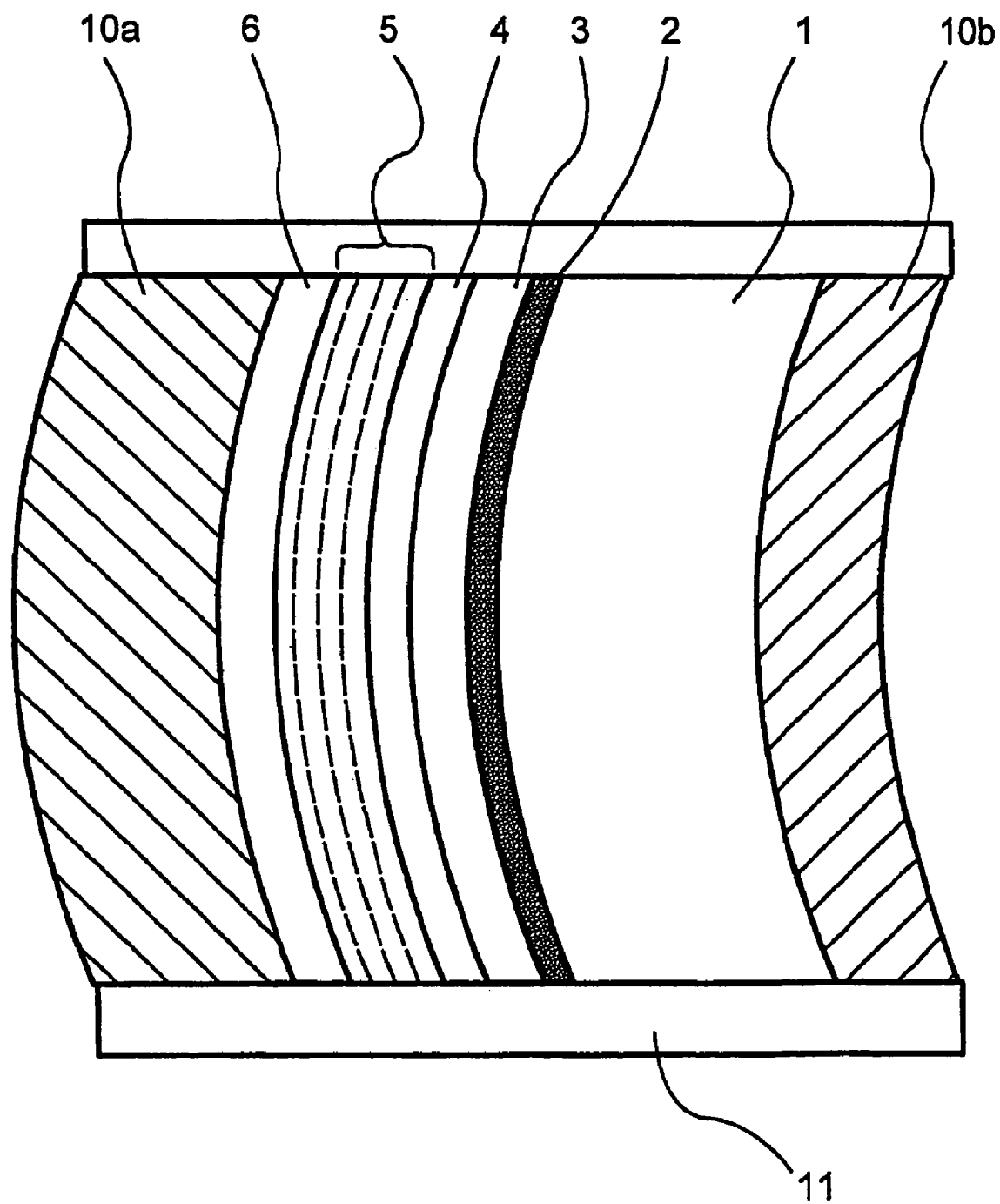
FIG. 7 is a schematic illustration of a second implementation of the method for manufacturing an optical item according to the invention.

FIG. 7 is a schematic illustration of the manufacture of a quarter waveplate according to the invention using the so-called IMC method.

On an appropriate surface of a first part of the mould 10a of a two-part mould conventional for manufacturing an ophthalmic lens, successively in the indicated order, are conventionally formed a higher coating 6 with hydrophobic properties, a multi-layer anti-reflection coating 5, an anti-abrasion hard coating 4 and an anti-shock primer layer 3.

On the surface of the primer layer 3 are formed, preferably through centrifugation or dip coating, an intermediate layer of colloidal mineral oxide with the required thickness and porosity.

After the two parts of the mould 10a, 10b have been assembled using an adhesive seal 11, a liquid monomer composition is injected into the mould cavity.

After hardening of the monomer composition, so as to form the substrat 1, and releasing, an item according to the invention is obtained.

In that case, the porosity of the intermediate layer 2 is filled by the material constituting the substrate 1.

The appropriate monomer compositions are any compositions conventionally used for manufacturing optical items, more particularly, ophthalmic lenses.

In FIG. 7, the various layers are formed on the front side of the item, but might as well be formed similarly on both sides of the final glass.

EXAMPLES

In the following examples, unless otherwise specified, all the percentages and parts are expressed by weight.

The colloid ratios in the various examples are expressed in dry matter weight.

The materials used in the examples are as follows:

1) Substrate polycarbonate (PC): bisphenol A homopolycarbonate marketed by Teijin or General Electric, thermohardenable polythiourethane—index $n_D^{25}$=1.6: MR6 marketed by MITSUI, thermohardenable polythiourethane—index $n_D^{25}$=1.67: MR7 marketed by MITSUI,
polyepisulfide—index $n_D^{25}$=1.74: marketed by MITSUI,
mineral glass: white Stigmal Essilor—index $n_D^{25}$=1.807.

2) Colloidal Mineral Oxide

|  | Mean refractive index of the particules $n_c$ | Diameter of the particles (nm) | pH |
|---|---|---|---|
| Silica-SiO$_2$ | | | |
| MA-ST (Nissan) | 1.48 | 10–12 | 3–4 |
| Stöber 176 | 1.48 | 74 | 6.5 |
| Stöber 229 | 1.48 | 71 | 6.5 |
| Ludox AS30 (Dupont) | 1.48 | 13–14 | 9.6 |
| Titanium dioxide TiO$_2$ | | | |
| 1130 F2 (CCIC) | 2.05 | 7–15 | 4–6 |
| 1120 ZS 95A8 (CCIC) | 1.92 | 6–10 | 3–6 |
| Zircon-ZrO$_2$ | | | |
| ZSL20N DAICHI KIGENSO | 2 | ~50 nm | 3 |

3) Primer
W 234 polyurethane latex from Baxenden
Butylacrylate/methylmethacrylate latex (ABu/MMA) disclosed in Patent Application FR 2,790,317.

4) Anti-Abrasion Coating

The anti-abrasion coating composition is prepared adding dropwise 42.9 parts of 0.1N hydrochloric acid to a solution containing 135.7 parts of γ-glycidoxypropyltriethoxysilane (GLYMO) and 49 parts of dimethyl-diethoxysilane (DMDES).

The hydrolyzed solution is added for 24 hours at room temperature, followed then by the addition of 8.8 parts of aluminum acetylacetonate, 26.5 parts of ethylcellulose, 400 parts of 30% colloidal silica in methanol and 157 parts of methanol.

A small amount of surfactant is then added. The theoretical dry extract of the composition approximately contains 10% of dry matter from the hydrolyzed DMDES.

5) Anti-Reflection Coating

The anti-reflection coating, when present, is formed through conventional vacuum coating of the following successive layers

|  | Material | Optical thickness (nm) |
|---|---|---|
| First layer coated | ZrO$_2$ | 55 |
| Second layer coated | SiO$_2$ | 30 |
| Third layer coated | ZrO$_2$ | 160 |
| Fourth layer coated (top layer) | SiO$_2$ | 120 |

The optical thicknesses are given for λ=550 nm.
In all the examples, the indicated porosities p or p' are initial porosities before filling.

Example 1 and Comparative Example C1 and C2

On one surface of a polythiourethane MR6 substrate, preliminarily treated by a soda solution as previously described, through dip coating in a 3% solution in methanol of a mixture 30/70 by weight of silica (MA-ST) and TiO$_2$ (1130F2), a colloidal mineral oxide layer is formed. After drying, the features of the mineral oxide layer are as follows:
 thickness: 63 nm
 refractive index: 1.385
 porosity p=42%.

This is followed successively, through dip coating, in the conditions as indicated hereinabove, by the formation of an anti-shock primer layer (W234) and an anti-abrasion coating layer.

The thickness of the primer layer is approximately 1 μm and that of the anti-abrasion coating is approximately 3.5 μm (example 1).

By way of comparison, on a surface of two MR6 substrates, through dip coating and in the same conditions, are formed an anti-abrasion hard coating layer (polysiloxane) with a refractive index of 1.6 adapted to that of the substrate (comparative example C1) on the one hand and a stack of a primer layer and an anti-abrasion hard coating similar to that of example 1 (comparative example C2).

Figure 8:
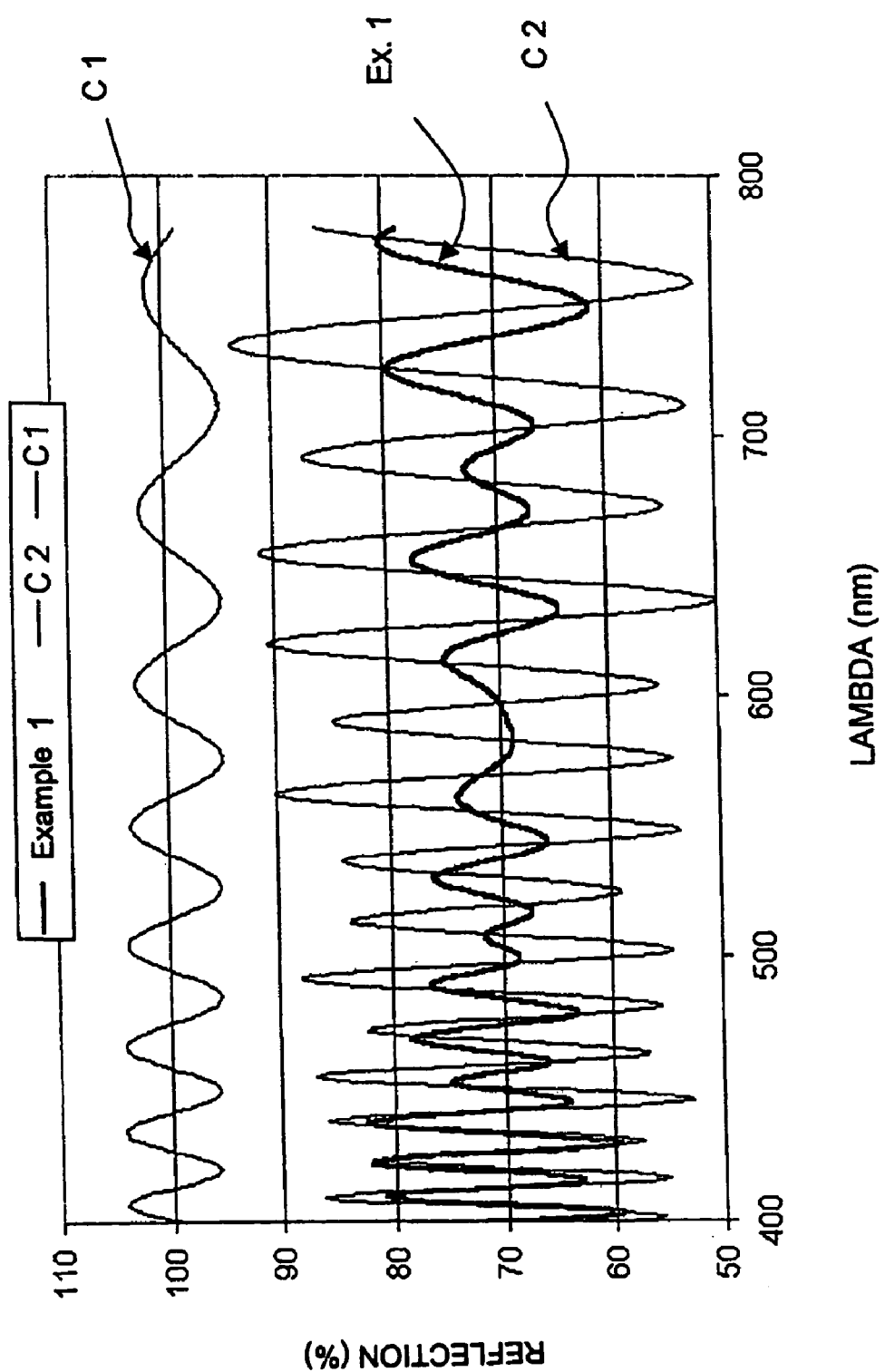
FIGS. 8 to 18 are diagrams of the reflection as a function of the wavelength of optical items according to the invention and by way of comparison, of similar optical items which do not comprise quarter wave intermediate layer.

The diagrams in FIG. 8 are reflection diagrams as a function of the wavelength of the coated substrates.

It can be seen that the mean reflection level of the adapted index system (C1) is higher than that of the non adapted systems (examples 1 and C2).

It is also to be noted that the flute amplitude is strongly reduced in the system from example 1 (interposed quarter waveplate) compared with the system in the comparative example C2.

Example 2 to 4 and Comparative Example C3

The example 1 is repeated, but using a polycarbonate substrate Lexan® (General Electric) and the following colloidal mineral oxide sols:

| Example n° | Mineral oxide sol |
|---|---|
| 2 | SiO$_2$ MA-ST/TiO$_2$ Z 1130F 70/30 at 3% in MeOH |
| 3 | SiO$_2$ Ludox AS 30/TiO$_2$ Z 1130F 70/30 at 3% in EtOH |
| 4 | SiO$_2$ MA-ST/TiO$_2$ Z 1120 ZS 95 A8 50/50 at 3% in MeOH |

The thicknesses, indices and porosities of the mineral oxide layers obtained are as follows:

| Example n° | Thickness of mineral oxide layer (nm) | Index n | Porosity p |
|---|---|---|---|
| 2 | 63 | 1.385 | 42% |
| 3 | 65 | 1.375 | 43% |
| 4 | 62 | 1.329 | 52% |

By way of a comparison (comparative example C3), directly on a polycarbonate similar substrate are directly formed primer and anti-abrasion coating layers, similar to those from example 1 (W 234 PU primer from Baxenden and anti-abrasion coating as defined hereabove).

Figure 9:
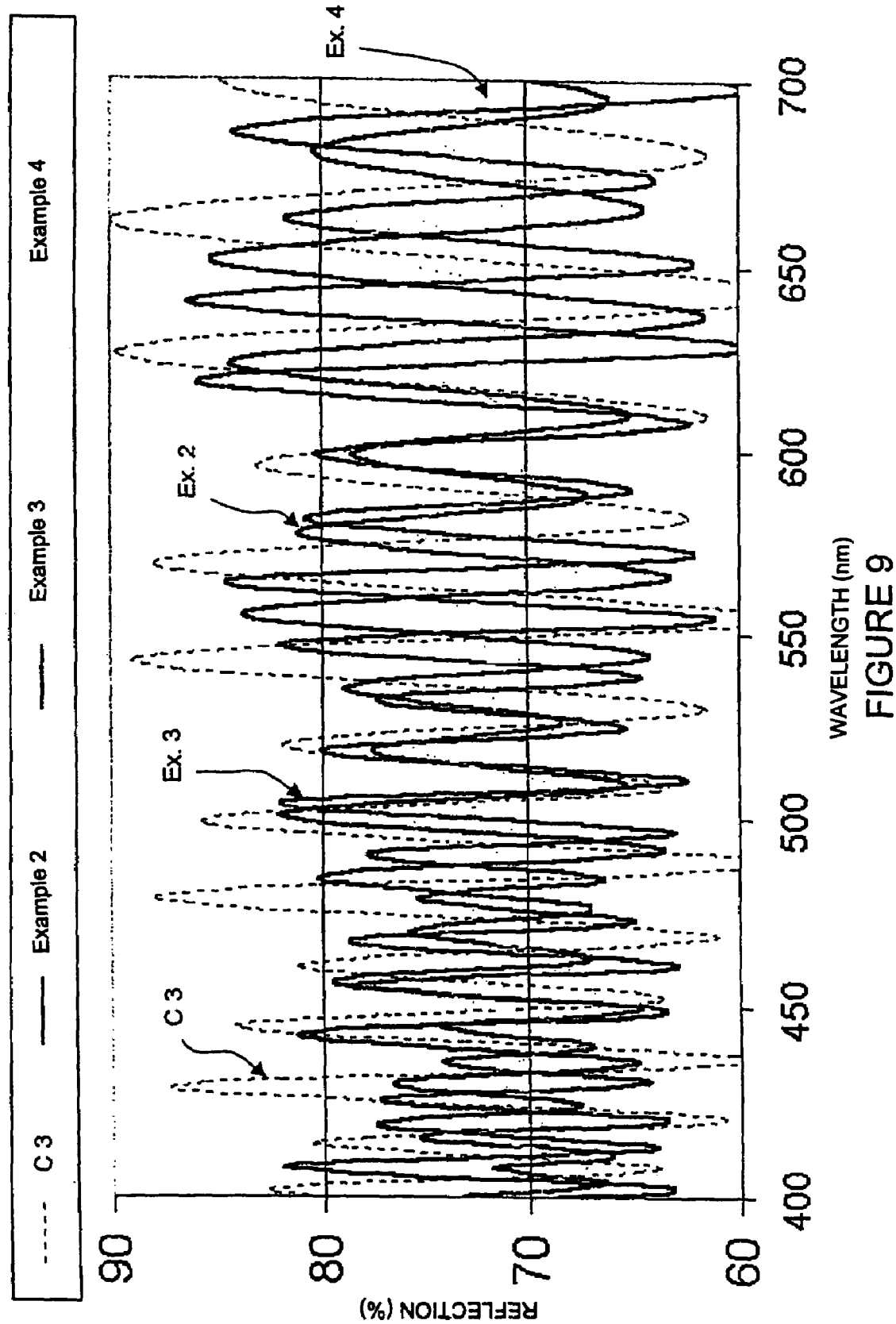

The results of the reflection as a function of the wavelength are represented by the diagram in FIG. 9.

Examples 5 to 7

Example 2 is repeated, but incorporating to the mineral oxide sol a binder in such an amount that the sol dry extract contains 10%, 20% and 30% of the binder. The binder being used is W-234 PU latex from Baxenden and the percentage of incorporated binder is expressed by weight based on the total dry weight of the sol mineral oxide. The sol compositions layers of the mineral oxide layer obtained are given in the table hereunder:

| Example n° | Mineral oxide sol Mineral oxide | Binder (%)* | Thickness of the mineral oxide layer (nm) | Refractive index n | Porosity (%) P | Porosity (%) p' |
|---|---|---|---|---|---|---|
| 5 | SiO$_2$ MA-ST/ TiO$_2$ 1130F2 70/30 at 2% in EtOH | 10 | 67 | 1.343 | 46 | 57 |
| 6 | SiO$_2$ MA-ST/ TiO$_2$ 1130F2 70/30 at 1.6% in EtOH | 20 | 74 | 1.378 | 38 | 59 |
| 7 | SiO$_2$ MA-ST/ TiO$_2$ 1130F2 70/30 at 1.5% in EtOH | 30 | 60 | 1.412 | 28 | 59 |

*PU W234 latex in % based on the mineral oxide weight

Figure 10:
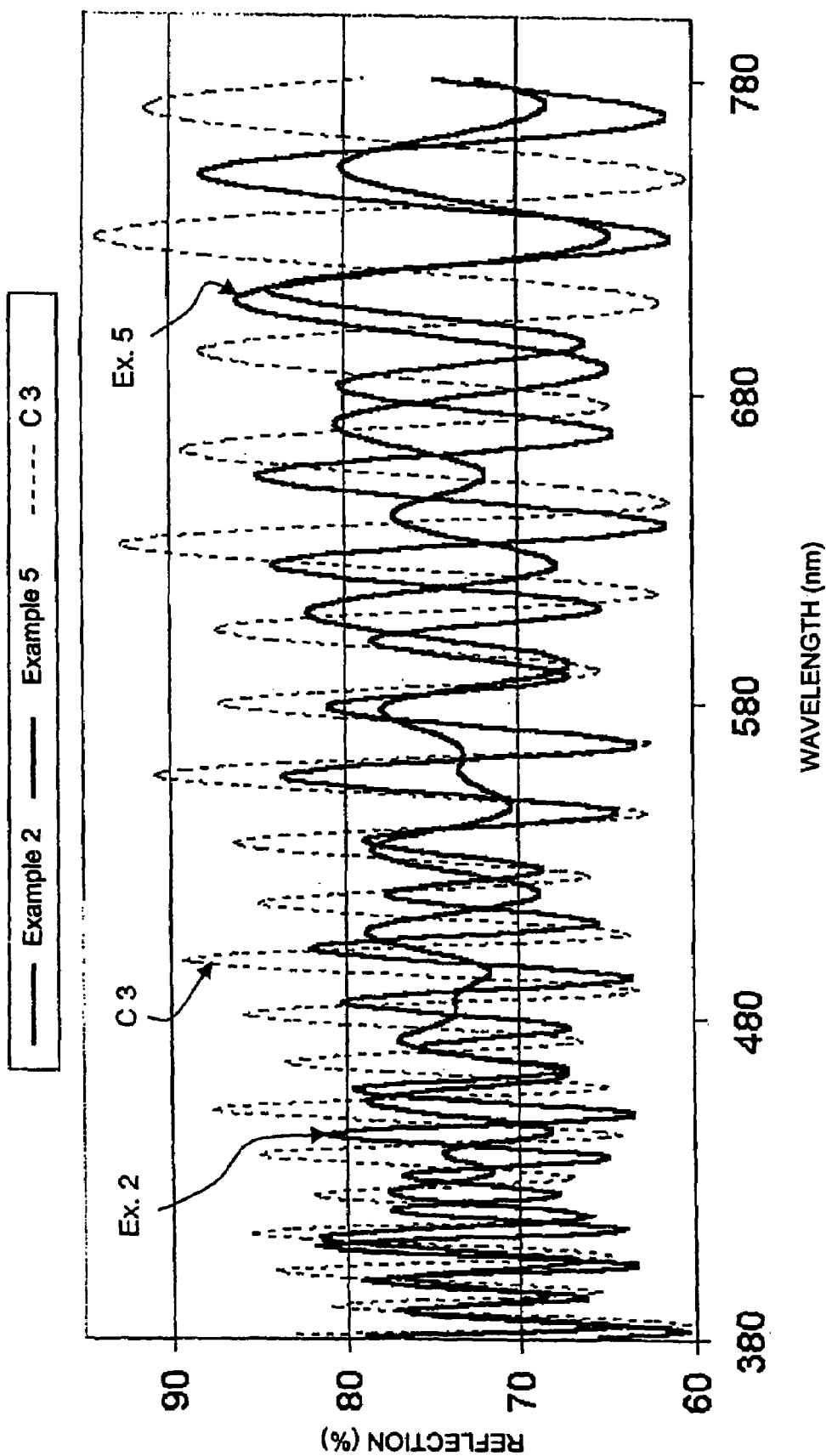
Figure 11:
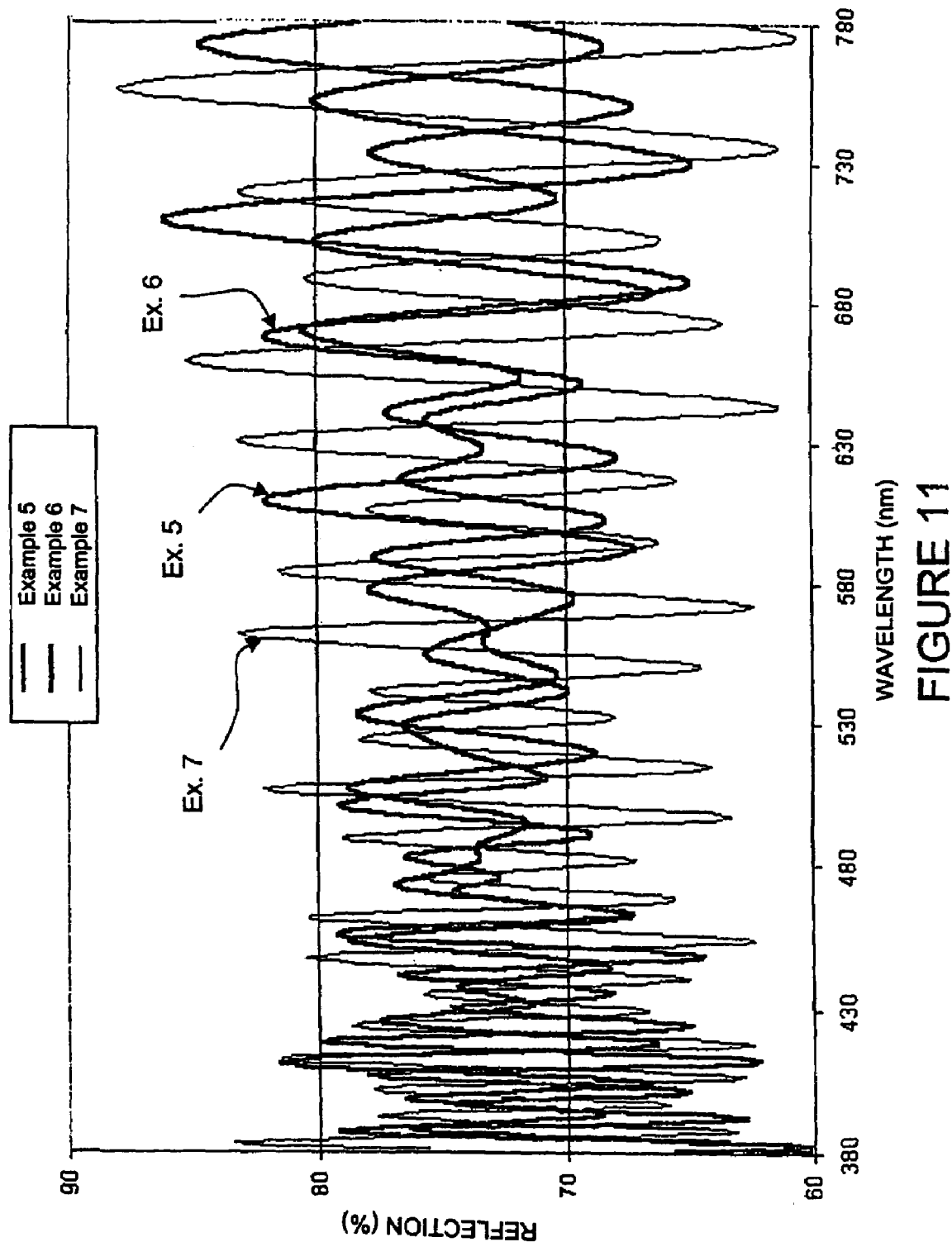

The results of the reflection as a function of the wavelength are given by the diagrams in FIGS. 10 and 11.

In FIG. 10, the results of the reflection from example 5 are directly compared with those of the comparative example C3 and example 2.

Example 8 to 10 and Comparative Example C4

Example 1 is repeated, but using a MR7 substrate and using the following mineral oxide sols:

| Example n° | Mineral oxide sol Mineral oxide | Binder (%)* | Thickness of the mineral oxide layer (nm) | Refractive index n | Porosity (%) P | Porosity (%) p' |
|---|---|---|---|---|---|---|
| 8 | SiO$_2$ MA-ST/ TiO$_2$ 1130F2 60/40 at 1.6% in EtOH | 20 | 72 | 1.410 | 35 | 57 |
| 9 | SiO$_2$ MA-ST/ TiO$_2$ 1130F2 50/50 at 1.6% in EtOH | 20 | 73 | 1.440 | 34 | 57 |
| 10 | SiO$_2$ MA-ST/ TiO$_2$ 1130F2 40/60 at 1.6% in EtOH | 20 | 61 | 1.470 | 32 | 57 |

*PU W234 latex in % based on the dry mineral oxide weight

By way of a comparative example C4, a MR7 substrate is also prepared coated with the primer layer and the anti-abrasion coating layer.

Figure 12:
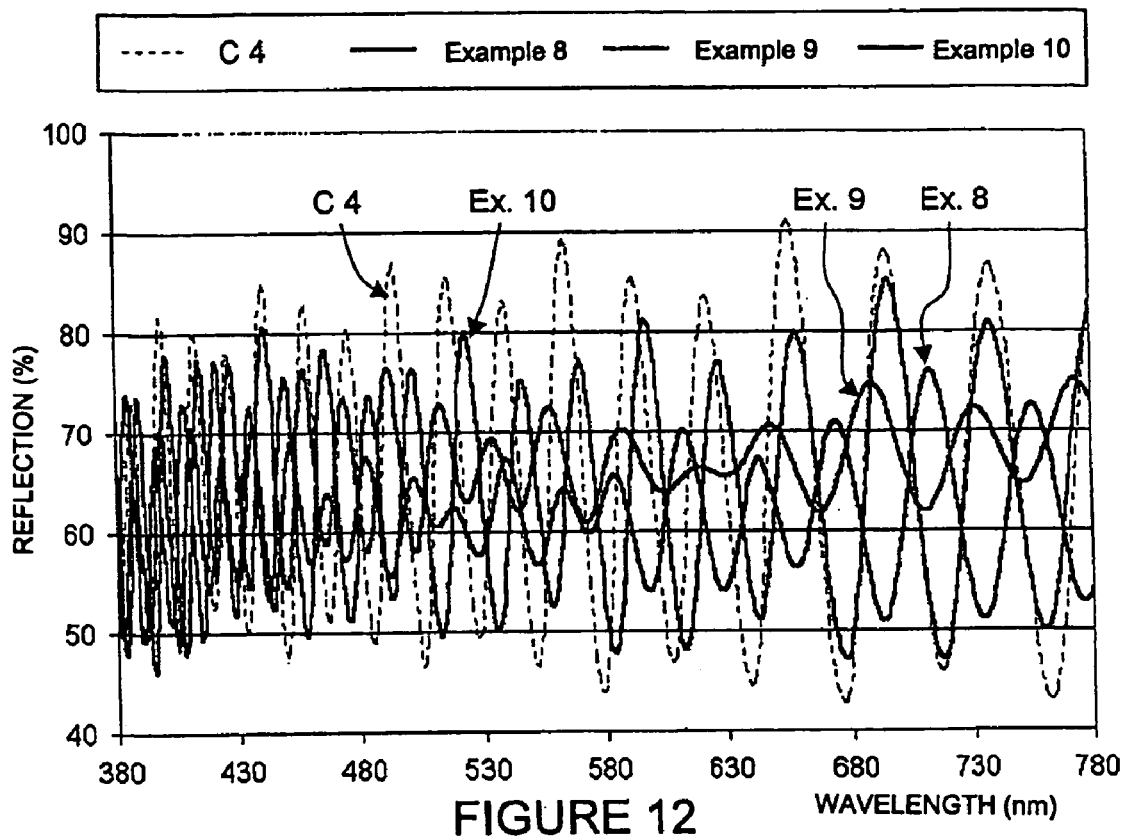

The results of the reflection measurement as a function of the wavelength are given by the diagrams in FIG. 12.

Example 11 to 13 and Comparative Example C5

Example 1 is repeated, but using a mineral glass substrate and using the following mineral oxide sols:

| Example n° | Mineral oxide sol Mineral oxide | Binder (%)* | Thickness of the mineral oxide layer (nm) | Refractive index n | Porosity (%) P | Porosity (%) p' |
|---|---|---|---|---|---|---|
| 11 | SiO$_2$ MA-ST/ TiO$_2$ 1130F2 50/50 at 1.6% in EtOH | 20 | 73 | 1.440 | 34 | 57 |
| 12 | SiO$_2$ MA-ST/ TiO$_2$ 1130F2 40/60 at 1.6% in EtOH | 20 | 61 | 1.470 | 32 | 57 |
| 13 | SiO$_2$ MA-ST/ TiO$_2$ 1130F2 30/70 at 1.6% in EtOH | 20 | 60 | 1.506 | 31 | 57 |

*PU W234 latex in % based on the dry metallic oxide weight

By way of a comparative example C5, a mineral substrate is also prepared directly coated with the primer layer and the anti-abrasion coating layer.

Figure 13:
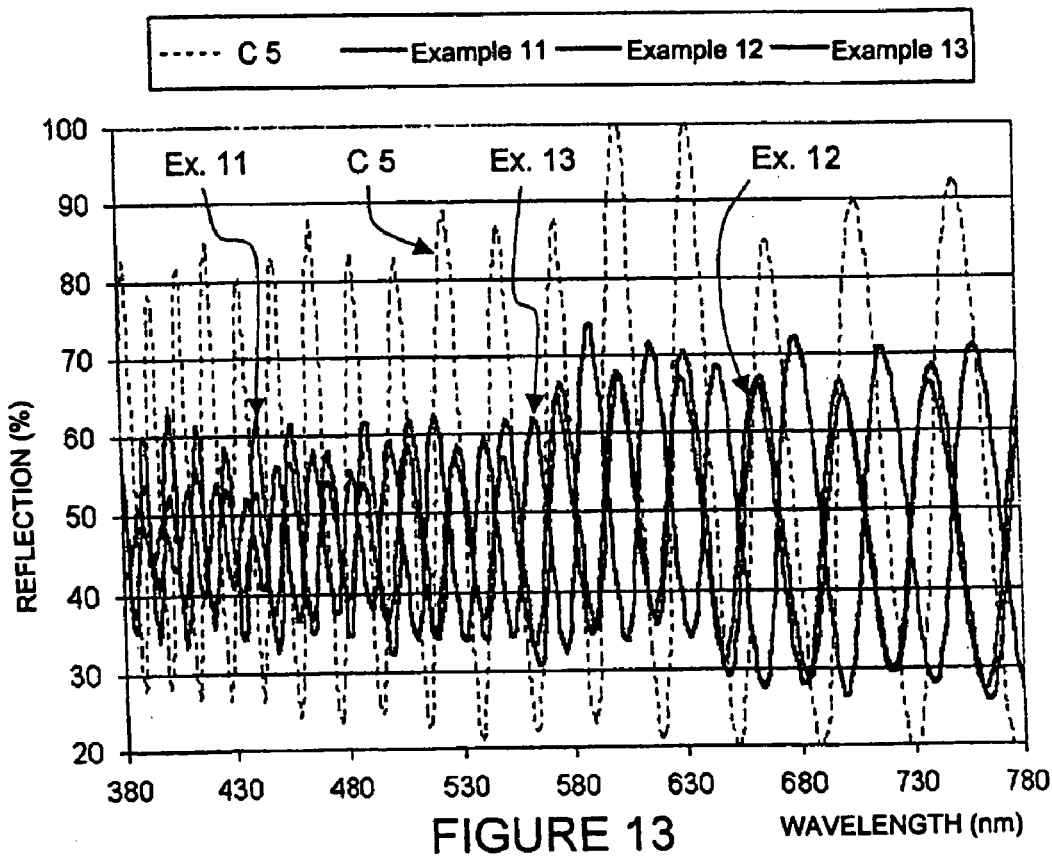

The results of the reflection measurements as a function of the wavelength are given by the diagrams in FIG. 13.

Example 14 to 19 and Comparative Example C6 and C7

The same procedure is used as in example 1, but using the substrates, mineral oxide sols and primers as mentioned in the table hereunder:

| | | Mineral oxide layer | | | | |
|---|---|---|---|---|---|---|
| Example n° | Substrate | Mineral oxide sol 176 | Thickness (nm) | Index | P (%) | Primer |
| 14 | MR7 | SiO$_2$ Stöber 176/ZrO$_2$ ZSL 20N 30/70 at 2% in EtOH | 83 | 1.284 | 67 | PUW234 Latex |
| 15 | PC | SiO$_2$ Stöber 176/ZrO$_2$ ZSL 20N 50/50 at 2% in EtOH | 115 | 1.289 | 60 | ABu/MMA Latex |

-continued

| Example n° | Substrate | Mineral oxide layer Mineral oxide sol 176 | Thickness (nm) | Index | P (%) | Primer |
|---|---|---|---|---|---|---|
| 16 | MR6 | SiO$_2$ Stöber 176/ZrO$_2$ ZSL 20N 50/50 at 2% in EtOH | 115 | 1.289 | 60 | ABu/MMA Latex |
| 17 | MR7 | SiO$_2$ Stöber 229/ZrO$_2$ ZSL 20N 30/70 at 2.5% in EtOH | 90 | 1.309 | 64 | PUW 234 Latex |
| 18 | MR7 | SiO$_2$ Stöber 229/ZrO$_2$ ZSL 20N 30/70 at 2.5% in EtOH | 103 | 1.328 | 61 | With no primer |
| 19 | MR7 | SiO$_2$ Stöber 229/ZrO$_2$ ZSL 20N 30/70 at 2.5% in EtOH | 103 | 1.328 | 61 | ABu/MMA Latex |
| C6 | PC | — | | | | ABu/MMA Latex |
| C7 | MR6 | — | | | | ABu/MMA Latex |

Figure 14:
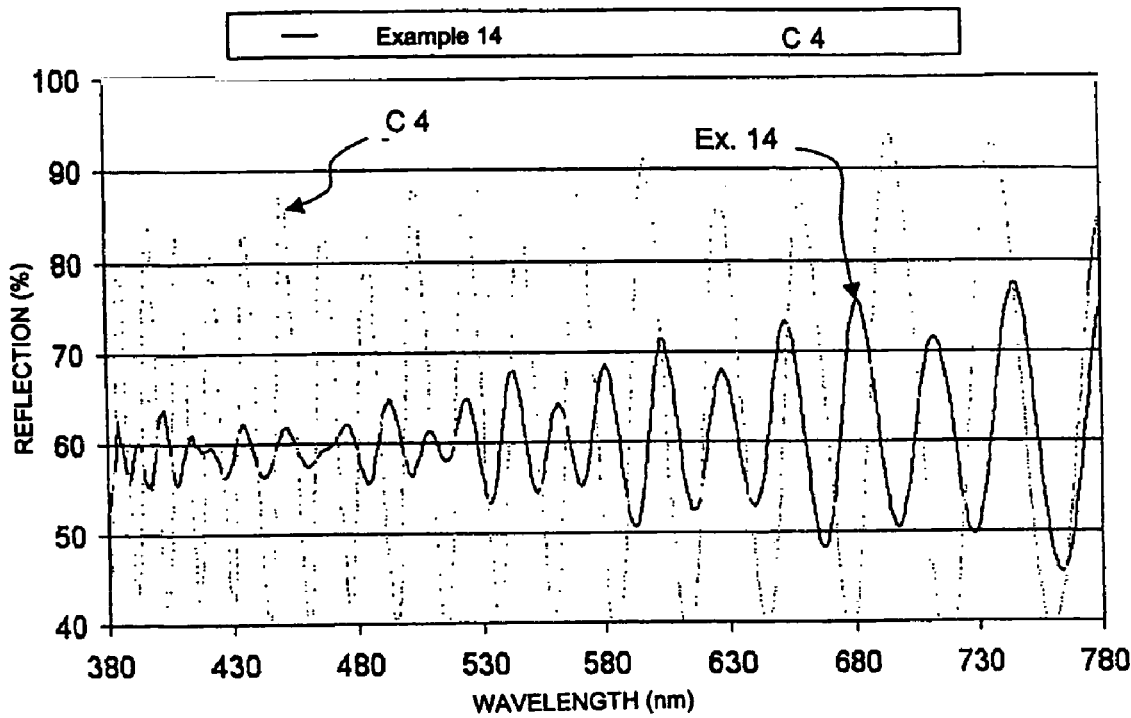
Figure 15:
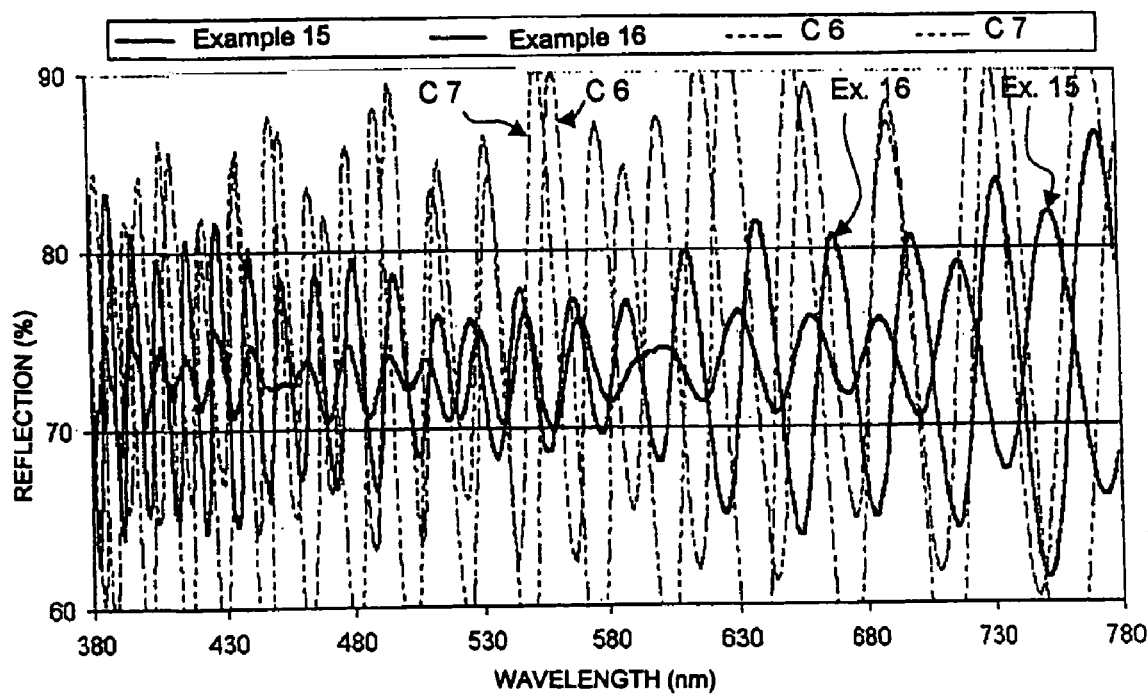
Figure 16:
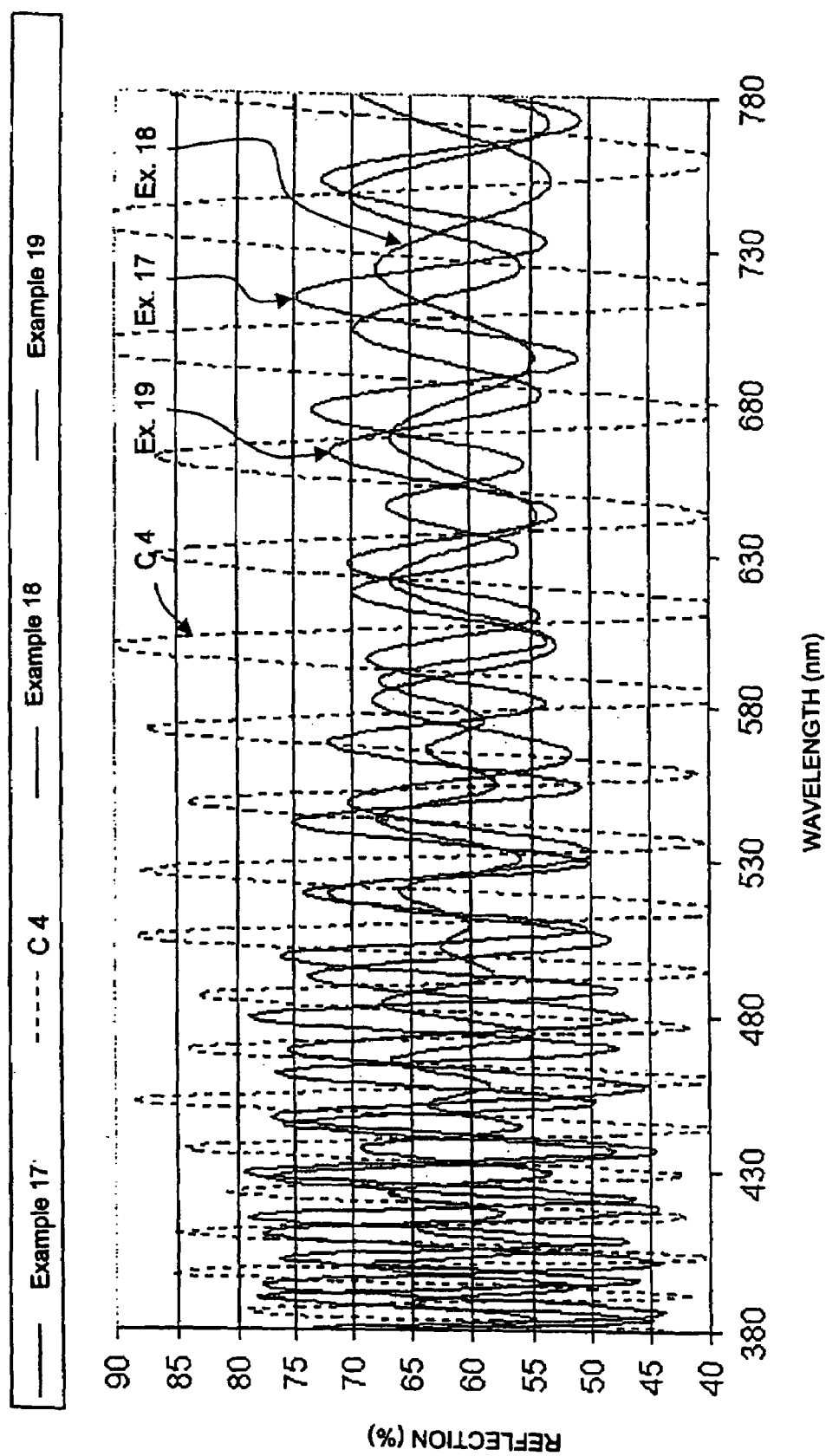

The reflection results as a function of the wavelength are shown in FIGS. 14 to 15.

Figure 19:
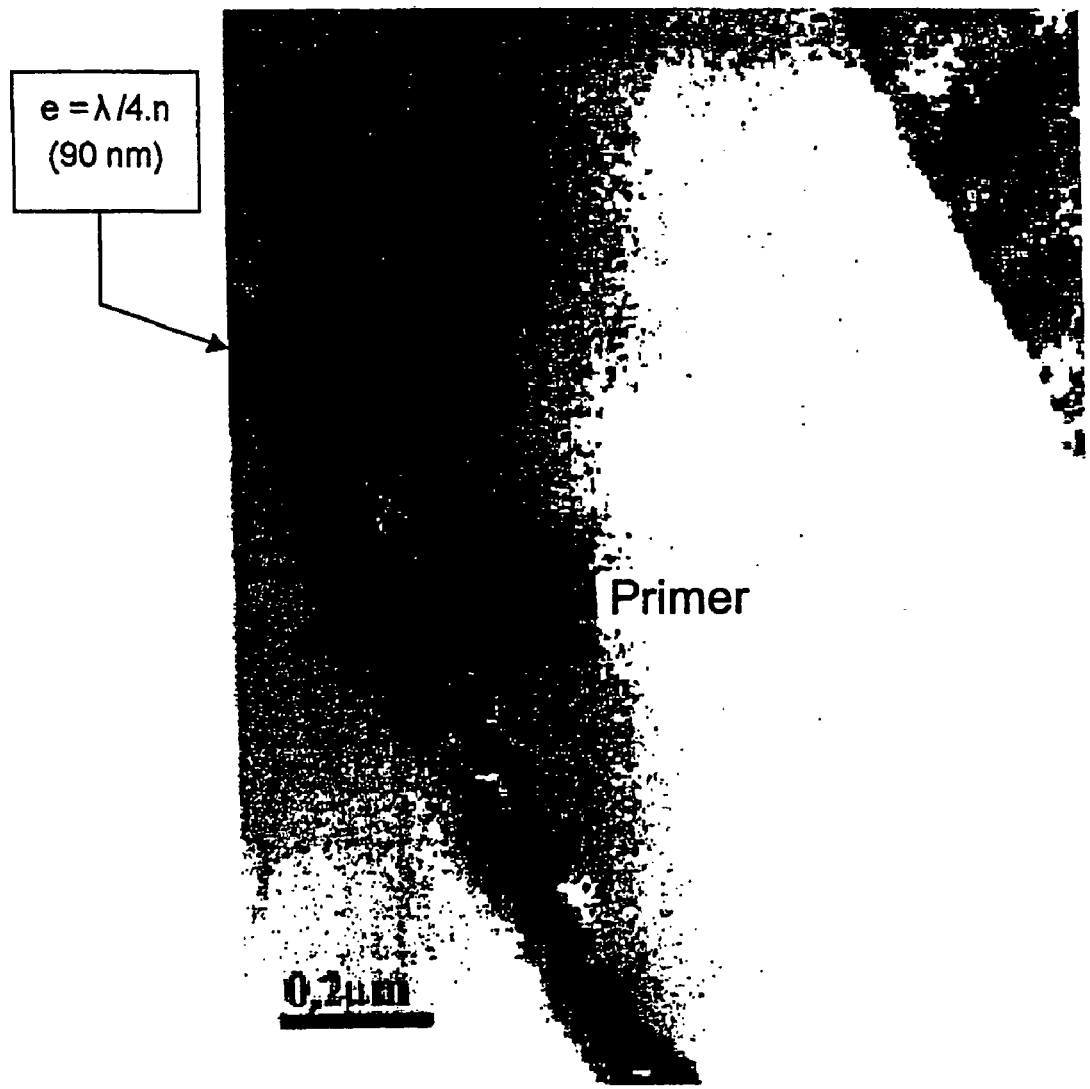
FIG. 19 is an electronic transmission microphotography for an optical item according to the invention.

FIG. 19 is a microphotograph of the coated item from example 17.

Example 20 to 22 and Comparative Example C8

The examples hereunder illustrate the use of mineral oxide dual layers.

Each of such mineral oxide dual layers is formed through dip coating as in example 1. The primer and anti-abrasion coatings are identical to those in example 1 and manufactured similarly. The substrates and mineral oxide sols used are given in the table hereunder.

| | | First layer | | | | Second layer | | |
|---|---|---|---|---|---|---|---|---|
| Example n°1 | Substrate | Mineral oxide sol | Thickness (nm) | Index | Porosity (%) | Mineral oxide sol | Thickness (nm) | Index | Porosity (%) |
| 20 | MR7 | SiO$_2$ Stöber 176/ZrO$_2$ ZSL 20N 20/80 at 2% in ethanol | 88 | 1.346 | 63 | SiO$_2$ Stöber 176/ZrO$_2$ ZSL 20N 50/50 at 2% in ethanol | 115 | 1.289 | 59 |
| 21 | Polyepisulfide n = 1.74 | SiO$_2$ Stöber 176/ZrO$_2$ ZSL 20N 13/87 at 2% in ethanol | 76 | 1.336 | 68 | SiO$_2$ Stöber 176/ZrO$_2$ ZSL 20N 50/50 at 2% in ethanol | 100 | 1.254 | 65 |

An item is also manufactured comprising a single mineral oxide layer according to the invention using the same procedure as in example 1, using the substrate and the mineral oxide sol hereunder and the same primer and anti-abrasion coatings as in example 1.

| Example n° | Mineral oxide sol | Thickness of the layer (nm) | Index | Porosity (%) |
|---|---|---|---|---|
| 22 | SiO$_2$ Stöber 176/ZrO$_2$ ZSL 20N 20/80 at . . . | 88 | 1.346 | 63 |

By way of a comparison (comparative example C8), a similar substrate (n=1.74) has been directly coated with the primer and anti-abrasion coatings.

Figure 17:
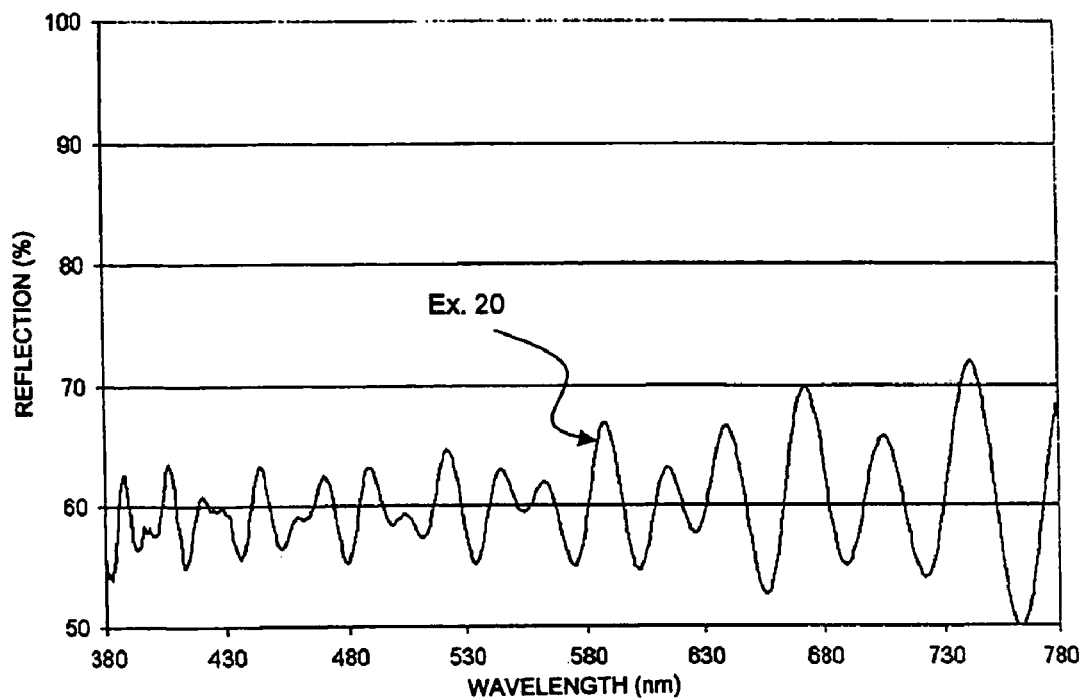
Figure 18:
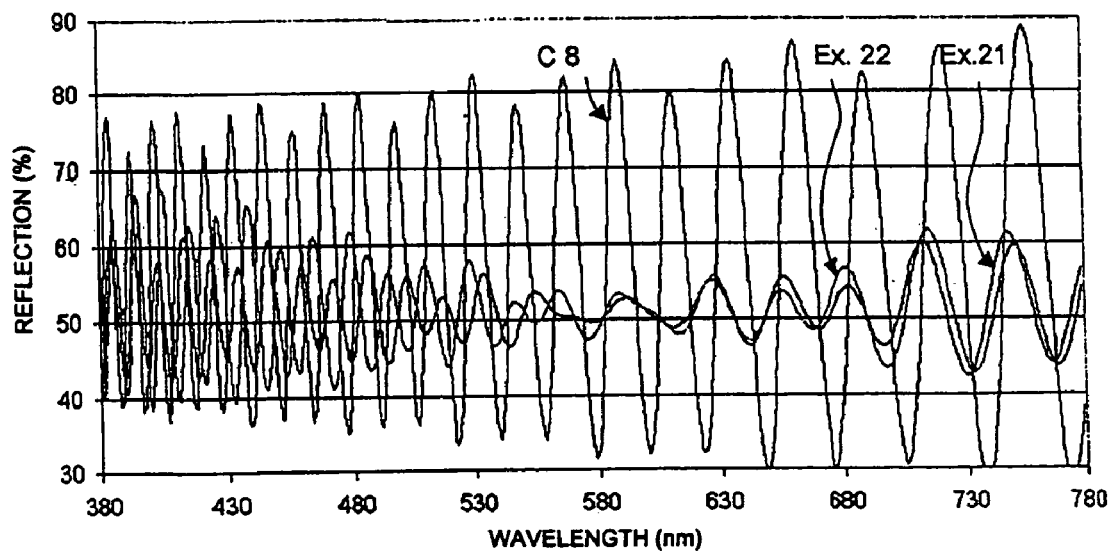

The reflection results as a function of the wavelength are given by the diagrams in FIGS. 17 and 18.

The invention claimed is:

1. An optical item comprising:
   an organic glass substrate or mineral glass substrate comprising at least one main side;
   a transparent polymeric material layer; and
   one or more intermediate layer(s), the one or more intermediate layer(s) defined as:
   between and in direct contact with the at least one main side of the substrate and the polymeric material layer;
   comprised of particles of at least one colloidal mineral oxide; and
   having pores that are at least partially filled either by material from the polymeric material layer or organic glass substrate material;
   wherein the one or more intermediate layer(s) form(s) a quarter waveplate with a wavelength in the range from 400 to 700 nm.

2. The optical item of claim 1, wherein the one or more intermediate layer(s) form(s) a quarter waveplate with a wavelength in the range from 450 to 650 nm.

3. The optical item of claim 1, wherein the pores in the one or more intermediate layer(s) form at least 40% by volume of the one or more intermediate layer(s).

4. The optical item of claim 3, wherein the pores in the one or more intermediate layer(s) form at least 50% by volume of the one or more intermediate layer(s).

5. The optical item of claim 1, wherein the one or more intermediate layer(s) comprise(s) a binder.

6. The optical item of claim 5, wherein pores of the one or more intermediate layer(s) are at least partially filled by the binder.

7. The optical item of claim 6, wherein, in the presence of the binder, the one or more intermediate layer(s) has (have) a porosity of at least 25%.

8. The optical item of claim 7, wherein, in the presence of the binder, the one or more intermediate layer(s) has (have) a porosity of at least 30%.

9. The optical item of claim 5, wherein the binder forms up to 30%, by weight, based on the total weight of dry mineral oxide of the one or more intermediate layer(s).

10. The optical item of claim 5, wherein the binder forms up to 25%, by weight, based on the total weight of dry mineral oxide of the one or more intermediate layer(s).

11. The optical item of claim 5, wherein the binder forms 10 to 20%, by weight, based on the total weight of dry mineral oxide of the one or more intermediate layer(s).

12. The optical item of claim 5, wherein the binder is a polyurethane latex.

13. The optical item of claim 1, wherein the particle size of the colloidal mineral oxide(s) ranges from 10 to 80 nm.

14. The optical item of claim 13, wherein the particle size of the colloidal mineral oxide(s) ranges from 30 to 80 nm.

15. The optical item of claim 14, wherein the particle size of the colloidal mineral oxide(s) ranges from 30 to 60 nm.

16. The optical item of claim 1, wherein the colloidal mineral oxide is $SiO_2$, $TiO_2$, $ZrO_2$, $SnO_2$, $Sb_2O_3$, $Y_2O_3$, $Ta_2O_5$, or a mixture comprising one of these.

17. The optical item of claim 16, wherein the intermediate layer(s) comprise(s) a mixture of at least one low index colloidal mineral oxide ($n_D^{25}<1.54$) and at least one high index colloidal mineral oxide ($n_D^{25} \geq 1.54$).

18. The optical item of claim 17, wherein the low index colloidal mineral oxide thigh index mineral oxide weight ratio ranges from 30/70 to 70/30.

19. The optical item of claim 17, wherein the colloidal mineral oxide mixture is a $SiO_2$ and $TiO_2$ mixture or a $SiO_2$ and $ZrO_2$ mixture.

20. The optical item of claim 1, further defined as comprising two intermediate layers.

21. The optical item of claim 1, further defined as comprising an organic glass substrate, wherein the organic glass substrate comprises a diethyleneglycol bis(allylcarbonate) polymer, a diethyleneglycol bis(allylcarbonate) copolymer, a homopolycarbonate, a copolycarbonate, a poly(meth)acrylate, a polythio(meth)acrylate, a polyurethane, a polythiourethane, a polyepoxyde, or a polyepisulfide.

22. The optical item of claim 1, wherein the substrate has a $n_D^{25}$ refractive index ranging from 1.55 to 1.80.

23. The optical item of claim 22, wherein the substrate has a $n_D^{25}$ refractive index ranging from 1.60 to 1.75.

24. The optical item of claim 1, wherein the polymeric material layer is a shock resistant primer layer.

25. The optical item of claim 24, wherein the primer comprises a (meth)acrylic polymer, thio(meth)acrylic polymer, polyester, polyurethane, or a polythiourethane based material.

26. The optical item of claim 25, wherein the primer material comprises a poly(meth)acrylic or a polyurethane latex.

27. The optical item of claim 24, further defined as comprising an anti-abrasion coating applied on the shock-resistant primer layer.

28. The optical item of claim 1, wherein the polymeric material layer is an anti-abrasion coating layer.

29. The optical item of claim 28, wherein the anti-abrasion coating results from the hardening of a composition comprising, as main constituents, an epoxy alkoxysilane, a dialkyldialkoxysilane and colloidal silica or a hydrolyzate of such constituents.

30. The optical item of claim 28, further defined as comprising an anti-reflection coating formed on the anti-abrasion coating.

31. The optical item of claim 1, further defined as an ophthalmic lens.

32. A method for manufacturing an optical item comprising:
coating at least one colloidal mineral oxide on at least one main surface of a support to form one or more intermediate layer(s) comprising at least one colloidal mineral oxide, wherein the one or more intermediate layer(s) has (have) pores; and
forming on the one or more intermediate layer(s) either an optically transparent polymeric material layer or an organic glass substrate;
wherein the pores of the one or more intermediate layer(s) are at least partially filled by polymeric material of the layer or by substrate material and the one or more the intermediate layer(s) form(s) a quarter waveplate in the range from 400 to 700 nm.

33. The method of claim 32, wherein at least one of the one or more the intermediate layer(s) form(s) a quarter waveplate in the range from 450 to 650 nm.

34. The method of claim 32, wherein the support is an organic or mineral glass substrate.

35. The method of claim 32, wherein the support is a main molding surface of a mold part of a mold comprising at least a coating that is a layer of optically transparent polymeric material, and the pores of the intermediate layer(s) are at least partially filled by material from the organic glass substrate.

36. The method of claim 35, wherein the substrate is formed by casting a liquid polymerisable composition in the mold and polymerisation of the composition.

37. The method of claim 32, wherein the optically transparent polymeric material layer or organic glass substrate is treated with a basic solution prior to the formation of the one or more intermediate layer(s).

38. The method of claim 32, wherein the pores of the one or more intermediate layer(s) form at least 40% by volume of the one or more intermediate layer(s).

39. The method of claim 32, wherein the pores of the one or more intermediate layer(s) form at least 50% by volume of the one or more intermediate layer(s).

40. The method of claim 32, wherein the particle size of the at least one or more colloidal mineral oxide ranges from 10 to 80 nm.

41. The method of claim 40, wherein the particle size of the at least one or more colloidal mineral oxide ranges from 30 to 80 nm.

42. The method of claim 41, wherein the particle size of the at least one or more colloidal mineral oxide ranges from 30 to 60 nm.

43. The method of claim 32, wherein the one or more intermediate layer(s) further comprise(s) a binder.

44. The method of claim 32, wherein the binder accounts for up to 30% of the one or more intermediate layer(s), by weight, based on the total weight of dry mineral oxide.

45. The method of claim 44, wherein the binder accounts for up to 25% of the one or more intermediate layer(s), by weight, based on the total weight of dry mineral oxide.

46. The method of claim 45, wherein the binder accounts for from 10 to 20% of the one or more intermediate layer(s), by weight, based on the total weight of dry mineral oxide.

47. The method of claim 43, wherein the binder is a polyurethane latex.

48. The method of claim 32, wherein the colloidal mineral oxide comprises $SiO_2$, $TiO_2$, $ZrO_2$, $SnO_2$, $Sb_2O_3$, $Y_2O_3$, and/or $Ta_2O_5$.

49. The method of claim 32, wherein the at least one intermediate layer(s) comprise(s) a mixture of at least one low index colloidal mineral oxide ($n_D^{25}<1.54$) and at least one high index colloidal mineral oxide ($n_D^{25}\geq1.54$).

50. The method of claim 49, wherein the low index colloidal mineral oxide/high index mineral oxide weight ratio ranges from 30/70 to 70/30.

51. The method of claim 49, wherein the colloidal mineral oxide mixture is a $SiO_2$ and $TiO_2$ mixture or a $SiO_2$ and $ZrO_2$ mixture.

52. The method of claim 32, further defined as comprising forming at least two intermediate layers.

53. The method of claim 32, wherein the one or more intermediate layer(s) is (are) formed on an organic glass substrate, and the organic glass substrate is further defined as comprising a diethyleneglycol bis(allylcarbonate) polymer, a diethyleneglycol bis(allylcarbonate) copolymer, a homopolycarbonate, a copolycarbonate, a poly(meth)acrylate, a polythio(meth)acrylate, a polyurethane, a polythiourethane, a polyepoxyde, or a polyepisulfide.

54. The method of claim 32, wherein the substrate has a $n_D^{25}$ refractive index ranging from 1.55 to 1.80.

55. The method of claim 54, wherein the substrate has a $n_D^{25}$ refractive index ranging from 1.60 to 1.75.

56. The method of claim 32, wherein the polymeric material layer is a shock resistant primer layer.

57. The method of claim 56, wherein the primer comprises a (meth)acrylic polymer, a thio(meth)acrylic polymer, a polyester, a polyurethane, or a polythiourethane-based material.

58. The method of claim 56, wherein the primer material is a poly(meth)acrylic or a polyurethane latex.

59. The method of claim 56, further comprising forming an anti-abrasion coating on the shock resistant primer layer.

60. The method of claim 59, wherein the anti-abrasion coating is formed through dip coating or centrifugation and hardening.

61. The method of claim 59, further defined as comprising the step of forming an anti-reflection coating on the anti-abrasion coating.

62. The method of claim 32, wherein the polymeric material layer is an anti-abrasion coating layer.

63. The method of claim 62, wherein the anti-abrasion coating is formed by hardening a composition comprising an epoxyalkoxysilane, a dialkyldialkoxysilane, and colloidal silica or a hydrolyzate of such a composition.

64. The method of claim 62, further defined as comprising the step of forming an anti-reflection coating on the anti-abrasion coating.

* * * * *

UNITED STATES PATENT AND TRADEMARK OFFICE
CERTIFICATE OF CORRECTION

| | | |
|---|---|---|
| PATENT NO. | : 7,008,690 B2 | Page 1 of 1 |
| APPLICATION NO. | : 10/466160 | |
| DATED | : March 7, 2006 | |
| INVENTOR(S) | : Caron et al. | |

It is certified that error appears in the above-identified patent and that said Letters Patent is hereby corrected as shown below:

In claim 5, column 19, line 2, delete "intennediate" and insert --intermediate-- therefor.

In claim 18, column 19, line 37, delete "thigh" and insert --/high-- therefor.

Signed and Sealed this

Twenty-second Day of August, 2006

JON W. DUDAS
*Director of the United States Patent and Trademark Office*